(12) United States Patent
Nishimori

(10) Patent No.: US 12,075,199 B2
(45) Date of Patent: Aug. 27, 2024

(54) IMAGE PROCESSING METHOD, STORAGE MEDIUM STORING PROGRAM, AND PROJECTOR

(71) Applicant: SEIKO EPSON CORPORATION, Tokyo (JP)

(72) Inventor: Takashi Nishimori, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/331,998

(22) Filed: Jun. 9, 2023

(65) Prior Publication Data

US 2023/0403379 A1 Dec. 14, 2023

(30) Foreign Application Priority Data

Jun. 9, 2022 (JP) .................... 2022-093541

(51) Int. Cl.
*H04N 9/31* (2006.01)

(52) U.S. Cl.
CPC ................. *H04N 9/3182* (2013.01)

(58) Field of Classification Search
CPC .................................................. H04N 9/3182
See application file for complete search history.

(56) References Cited

U.S. PATENT DOCUMENTS

| | | | | |
|---|---|---|---|---|
| 5,822,002 | A * | 10/1998 | Tokoro ..................... | H04N 9/31 348/588 |
| 11,054,978 | B2 * | 7/2021 | Agarwal .................. | G09G 5/00 |
| 2014/0092117 | A1 * | 4/2014 | Yoshimura ............... | G09G 5/02 345/589 |
| 2014/0104581 | A1 * | 4/2014 | Yoshimura ............. | G03B 21/26 353/30 |
| 2021/0366367 | A1 * | 11/2021 | Choi ...................... | G09G 3/2003 |

FOREIGN PATENT DOCUMENTS

| | | |
|---|---|---|
| JP | 2010-243533 A | 10/2010 |
| JP | 2014-071444 A | 4/2014 |
| JP | 2015-192310 A | 11/2015 |
| JP | 2019-124872 A | 7/2019 |
| JP | 2020-134705 A | 8/2020 |

OTHER PUBLICATIONS

Sharp NEC Display Solutions, Ltd.; ProAssist Picture Adjustments; 6 pgs.
Panasonic Corporation; Downlight Projector BioSHADOW, 2 pgs.
Panasonic Corporation; Examples of Ambiences Created with BioSHADOW and Built-in Content at Various Scenes, 3 pgs.

* cited by examiner

*Primary Examiner* — Amit Chatly
(74) *Attorney, Agent, or Firm* — Dority & Manning, P.A.

(57) ABSTRACT

An image processing method comprising displaying a first image; displaying a first correction point, with which first brightness is associated, at a first position in the first image; moving the first correction point from the first position to a second position along a first axis of the first image; and generating a second image that has the first brightness in a first range including a position corresponding to the second position and intersecting with the first axis.

9 Claims, 21 Drawing Sheets

009# IMAGE PROCESSING METHOD, STORAGE MEDIUM STORING PROGRAM, AND PROJECTOR

The present application is based on, and claims priority from JP Application Serial Number 2022-093541, filed Jun. 9, 2022, the disclosure of which is hereby incorporated by reference herein in its entirety.

BACKGROUND

1. Technical Field

The present disclosure relates to an image processing method, a non-transitory storage medium storing a program, and a projector.

2. Related Art

JP-A-2014-71444 describes a method for correcting luminance unevenness produced by a projection-type image display apparatus, the method including preparing nine pattern images showing patterned, luminance adjustment target regions of an image, displaying the nine patterned images in the form of OSD images when the luminance unevenness is corrected, and adjusting the luminance of the image for an adjustment target region corresponding to a patterned image selected by a user.

The nine patterned images are patterned images showing an upper left region, a left region, a lower left region, an upper right region, a right region, a lower right region, an upper region, a lower region, and the overall region of the image.

When a projection-type image display apparatus is installed and an image is projected therefrom, it is difficult to pattern the adjustment target regions because a variety of luminance unevenness patterns occur in the projected image due, for example, to the material, irregularities, and hue of walls and pillars, illumination light from other illuminators, environmental light, or the projection angle and the projection range. There has therefore been a demand for development of a new luminance unevenness correction method that allows correction of a variety of luminance unevenness patterns without having to prepare pattern images in advance that match the variety of types of luminance unevenness.

SUMMARY

An image processing method according to an aspect of the present disclosure includes displaying a first image, displaying a first correction point, with which first brightness is associated, at a first position in the first image, moving the first correction point from the first position to a second position along a first axis of the first image, and generating a second image that contains a position corresponding to the second position in the first image and has the first brightness in a range that intersects with the first axis.

A program in a non-transitory computer-readable storage medium according to another aspect of the present disclosure causes an image display apparatus to display a first image, display a first correction point, with which first brightness is associated, at a first position in the first image, move the first correction point from the first position to a second position along a first axis of the first image, and generate a second image that contains a position corresponding to the second position in the first image and has the first brightness in a range that intersects with the first axis.

A projector according to another aspect of the present disclosure includes an optical apparatus, and a processor, and the processor uses the optical apparatus to display a first image on a projection screen, uses the optical apparatus to display a first correction point, with which first brightness is associated, at a first position in the first image, moves the first correction point from the first position to a second position along a first axis of the first image, and generates a second image that contains a position corresponding to the second position in the first image and has the first brightness in a range that intersects with the first axis.

DESCRIPTION OF EXEMPLARY EMBODIMENTS

Figure 1:
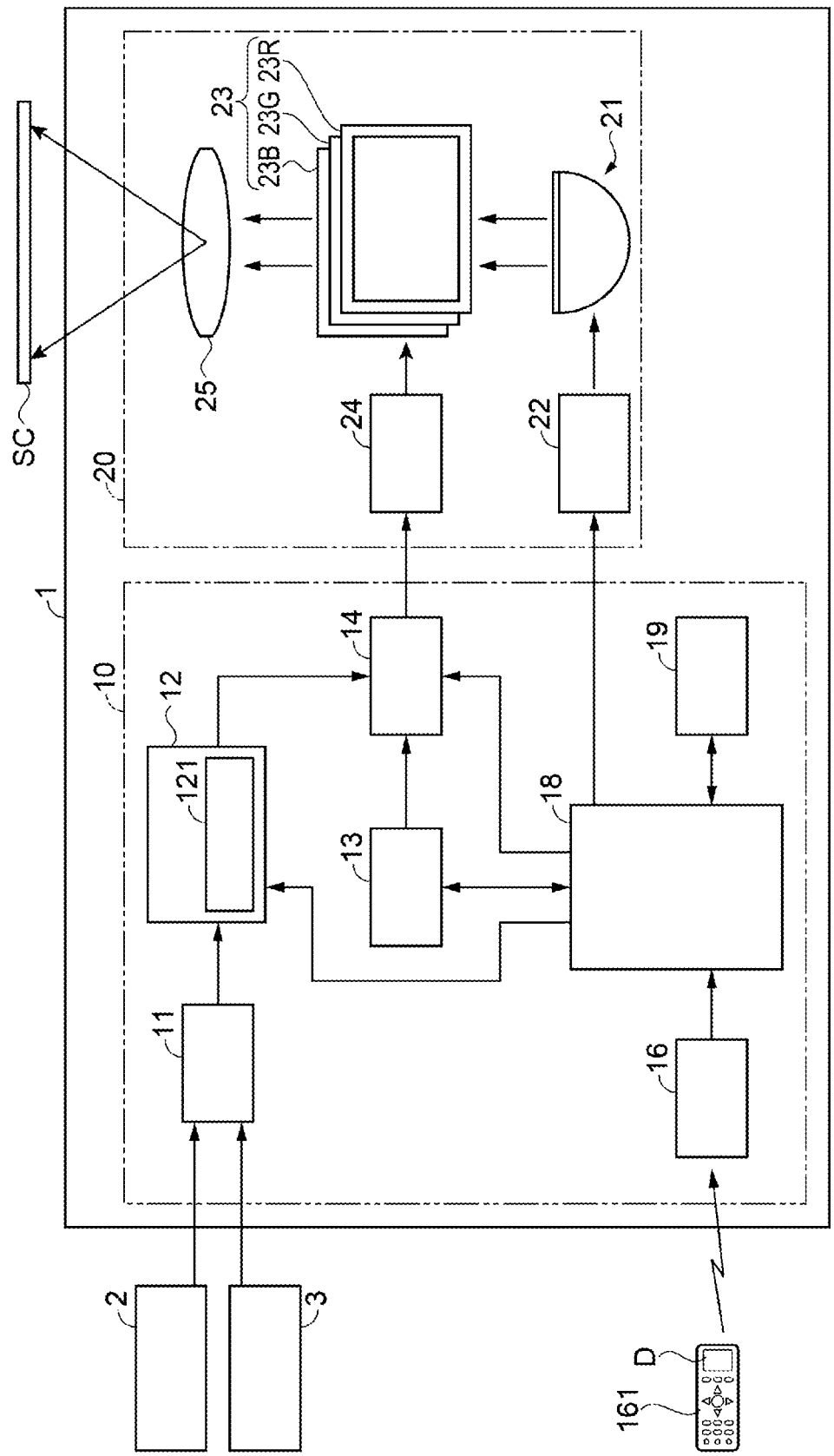
FIG. 1 is a block diagram showing a schematic configuration of a projector.

Embodiments according to the present disclosure will be described below with reference to the drawings.

In the drawings, the scale of each member differs in some cases from the actual value to make the member large enough to be recognizable.

Axes X, Y, and Z, which are perpendicular to each other, are drawn in the drawings as appropriate, with the direction along the axis X called a direction X, the direction along the axis Y called a direction Y, and the direction along the axis Z called a direction Z. One side along the direction Y may be referred to as an upper side, and the other side may be referred to as a lower side. One side along the direction X may be referred to as a left side, and the other side may be referred to as a right side.

1. First Embodiment

1.1. Overall Configuration of Image Display Apparatus

An overall configuration of a projector 1 as an image display apparatus will be described with reference to FIG. 1. FIG. 1 is a block diagram showing a schematic configuration of the projector according to the first embodiment.

The projector 1 includes a processor 10 and an optical apparatus 20.

The processor 10 has, as functional blocks, a signal input section 11, an image processing section 12, a brightness correction section 121, an OSD processing section 13, an image information output section 14, an input section 16, a control section 18, which controls each of the sections described above, and a storage section 19, which stores a control program including a luminance unevenness correction program, control programs, and content images and other pieces of image information. The processor 10 includes one or more processors, such as a CPU (central processing unit). A portion or the entirety of the processor 10 may be realized by hardware, such as an SOC (system on a chip), a DSP (digital signal processor), an ASIC (application specific integrated circuit), a PLD (programmable logic device), and an FPGA (field programmable gate array).

The optical apparatus 20 includes a light source section 21, such as a laser light source, a light source driver 22, a liquid crystal light valve 23 as a light modulator, a light valve driver 24, and a projection lens 25. The light source driver 22 and light valve driver 24 may be contained in the configuration of the processor 10 or may be implemented in the liquid crystal light valve 23, for example, by using any of COF (chip on film), COG (chip on glass), and CG silicon (continuous grain silicon) technologies.

The signal input section 11 accepts image information inputted from an external instrument 2, such as a personal computer and a DVD player, an external storage medium 3, such as a USB memory, an external server coupled via an Internet line that is not shown, or any other source, and outputs the image information to the image processing section 12.

The image processing section 12 performs predetermined image processing based on the image processing programs on the image information and outputs the processed image information to the image information output section 14. Examples of the predetermined image processing include image quality adjustment, such as luminance unevenness correction, resolution conversion, and sharpness adjustment. The image information may be processed in the form of a digital or analog signal.

In the image processing section 12, the brightness correction section 121 corrects the brightness of the image information based on brightness correction information. The brightness correction section 121 further corrects the brightness of the image information based on the brightness unevenness correction program, and stores information used in the correction as the brightness correction information in the storage section 19.

The OSD processing section 13 outputs OSD image information, which is a menu image or a message image to be superimposed on the image information processed by the image processing section 12, based on an instruction from the control section 18. The OSD image information is stored in an internal memory or the storage section 19.

The image information output section 14 outputs the image information and the OSD image information to the optical apparatus 20.

The input section 16 accepts a user's input operation. In the present embodiment, the input section 16 includes an operation remote control 161, which is remotely operable.

The operation remote control 161 includes a plurality of operation keys, which allow the user to issue a variety of instructions, and a screen D, which displays image information according to the content of operation made via the operation remote control 161. The screen D displays a first image used to correct the brightness of the image information based on the brightness unevenness correction program. Image information on the first image may be stored in an internal memory of the operation remote control 161, or may be supplied from the image information output section 14 to the operation remote control 161 via the input section 16.

When the user operates the operation remote control 161, the input section 16 outputs an operation signal according to the content of the user's operation to the control section 18.

The control section 18 is a central processing unit that performs a variety of types of arithmetic operation and oversees and controls the projector 1.

The storage section 19 is formed of a ROM (read only memory), a RAM (random access memory), and other memories. The ROM stores the control programs including the luminance unevenness correction program, and control data used by the control programs. The control data includes the first image used by the luminance unevenness correction program, the brightness correction information set by the luminance unevenness correction program, and other pieces of information. The RAM is used as a work region where the control section 18 performs the variety of types of arithmetic operation. The control programs including the luminance unevenness correction program, and the control data are stored in the external server and can be downloaded via the Internet line in a timely manner.

The optical apparatus 20 projects an image based on the image information inputted from the image information output section 14 on a screen SC. In the present embodiment, a wall or a pillar is used as the screen SC.

Out of the light emitted from the light source section 21, red (R) light is incident on a liquid crystal light valve 23R for red, green light is incident on a liquid crystal light valve 23G for green, and blue light is incident on a liquid crystal light valve 23B for blue.

The light source driver 22 controls supply and stopping the supply of electric power to the light source section 21 based on an instruction from the control section 18 to turn the light source section 21 on and off.

The liquid crystal light valve 23 is formed of transmissive liquid crystal panels. The liquid crystal light valve 23 may instead be formed of reflective liquid crystal panels, liquid crystal panels based on LCOS (liquid crystal on silicon), or light modulation panels other than liquid crystal panels, for example, DMDs (digital micromirror devices).

The light valve driver 24 applies a drive voltage according to the image information to each pixel of the liquid crystal light valve 23 to set the light transmittance of the pixel.

The light modulated by the liquid crystal light valve 23R, the light modulated by the liquid crystal light valve 23G, and the light modulated by the liquid crystal light valve 23B are combined with one another by a dichroic prism that is not shown, and the combined light is projected onto a wall or a pillar via the projection lens 25.

1.2. Example of Installation of Projector

Figure 2A:
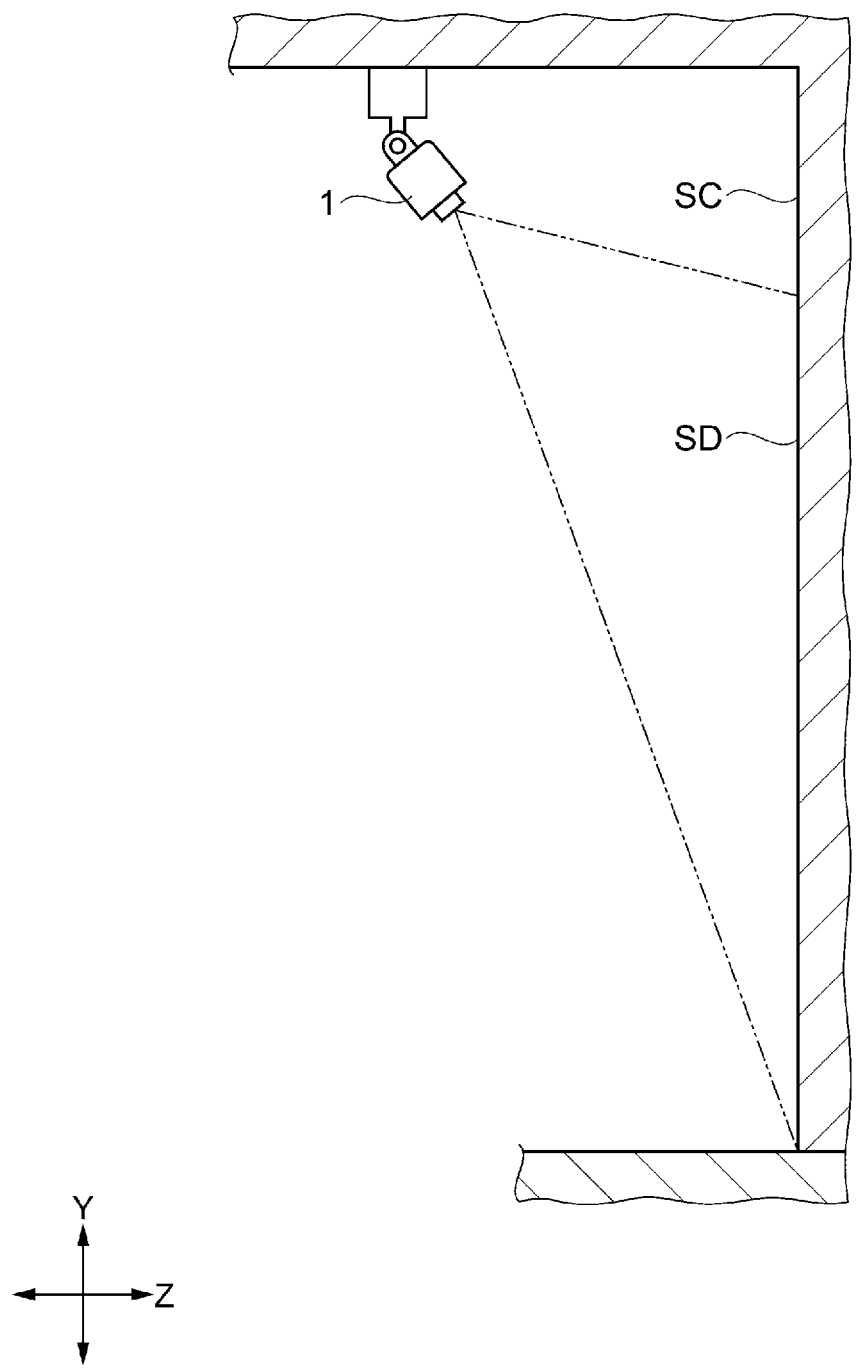
FIG. 2A is a descriptive diagram showing an example of installation of the projector.
Figure 2B:
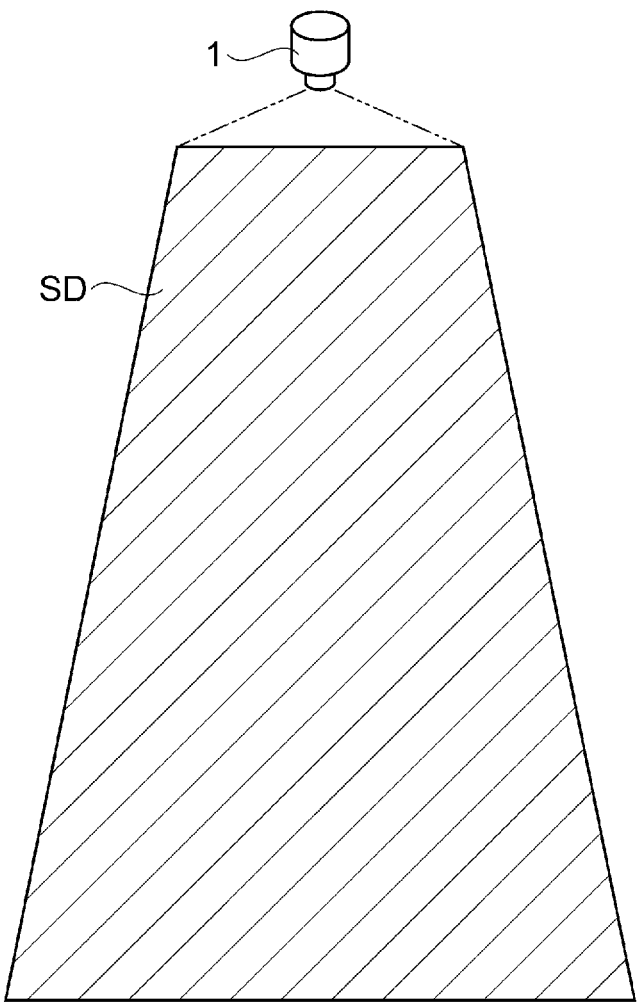
FIG. 2B is a descriptive diagram showing the example of the installation of the projector.
Figure 2C:
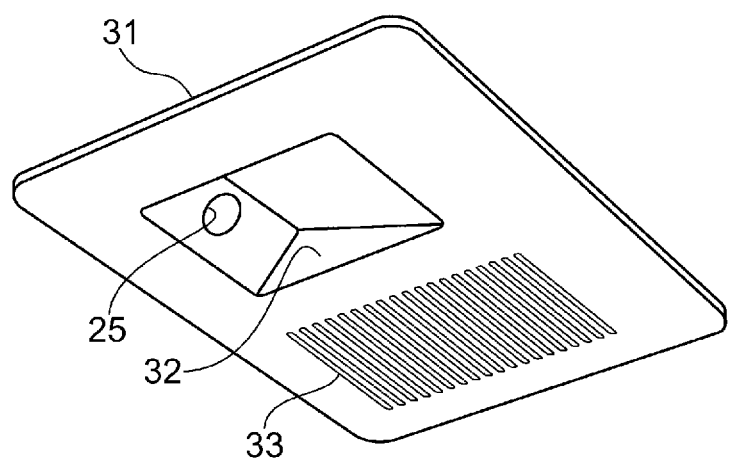
FIG. 2C is a descriptive diagram showing the example of the installation of the projector.

An example of the installation of the projector 1 will be described with reference to FIGS. 2A, 2B, and 2C. FIGS. 2A, 2B, and 2C are all descriptive diagrams showing the example of the installation of the projector.

Projection-type image display apparatuses have recently been studied in terms of usage in a variety of manners at a variety of locations. For example, projection-type image display apparatuses are installed at the ceilings of a reception, corridors, guest rooms, restrooms, an entrance, and other places, and project nature inspiring video or other images on walls and pillars to create spaces providing a sense of openness, as if the spaces were linked to the outside space, spaces that are relaxing and refreshing, and other spaces. In such an application, the projector 1 is installed at a ceiling near a wall, as shown, for example, in FIG. 2A. The projector 1 projects an image on a wall as the screen SC. The image projected from the projector 1 is projected over a range from a region near the ceiling to the floor, as shown in FIG. 2B. A projection screen SD indicates the image projected onto the wall.

The projection screen SD has a trapezoidal shape elongated in the upward-downward direction of the wall. In the present embodiment, the lengthwise direction of the projection screen SD, that is, the direction along the upward-downward direction of the wall is assumed to be the direction Y along the axis Y as a first axis.

The shape of the projection screen SD can be an oblong shape, a barrel shape, a pin cushion shape, an elliptical shape, or any other shape by using a shape correction function, a trimming function, or any other function. The projection screen SD may instead be projected in the shape of the projection light from the projector 1 without using the shape correction function, the trimming function, or any other function. That is, when the projection light from the projector 1 has an elliptical shape, the shape of the projection screen SD also has an elliptical shape.

The projector 1 is, for example, buried in the ceiling with the projector 1 covered with a cover member 31, as shown in FIG. 2C. The cover member 31 has a projection port 32, which is provided with a viewing hole via which the light from the projection lens 25 passes, and a loudspeaker 33.

1.3. Luminance Unevenness Correction Method

A specific example of a luminance unevenness correction method as an image processing method according to the present embodiment will next be described with reference to FIGS. 3 to 12.

Figure 3:
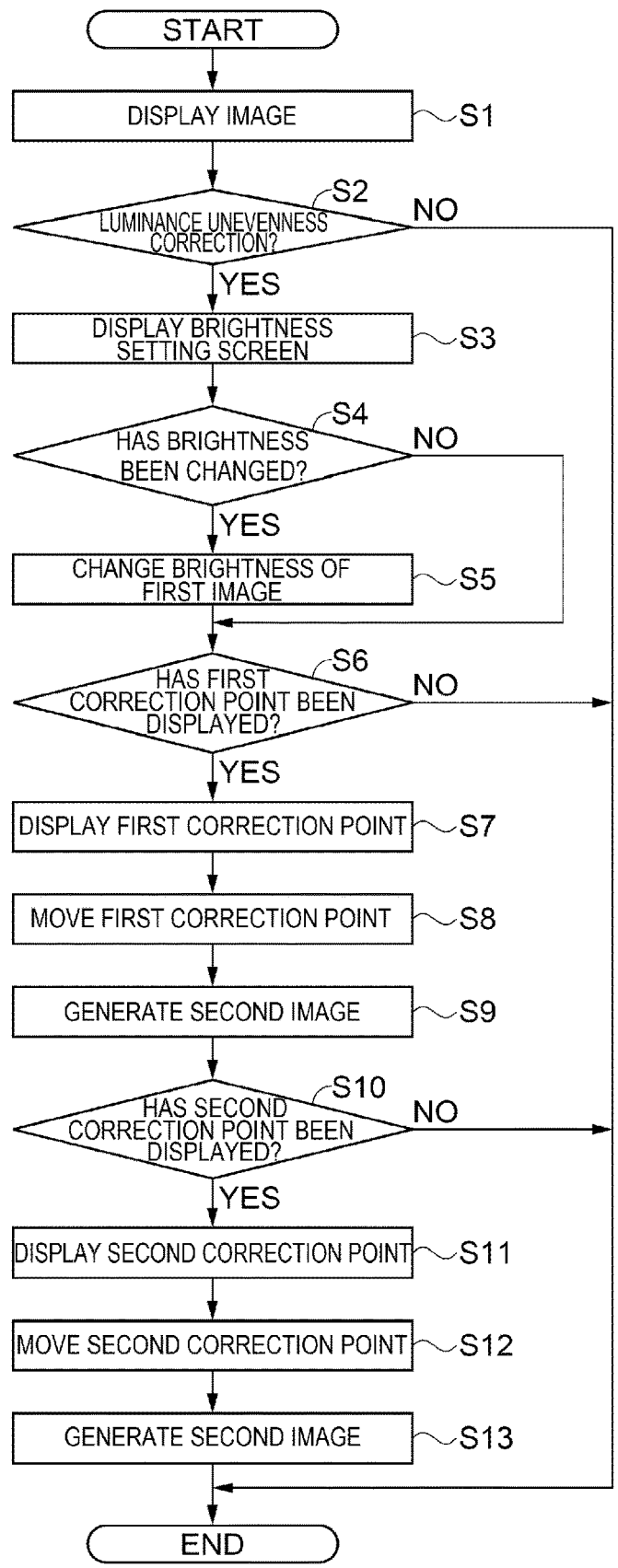
FIG. 3 is a flowchart showing the procedure of luminance unevenness correction.

FIG. 3 is a flowchart showing the procedure of the luminance unevenness correction. FIGS. 4A, 5A, 6A, 8A, 9A, and 11A are descriptive diagrams for describing an operation screen via which the luminance unevenness correction is performed in Adjustment Examples 1 to 4. FIGS. 4B, 5B, 6B, 7, 8B, 9B, 10, 11B, and 12 are descriptive diagrams for describing a projection screen via which the luminance unevenness correction is performed in Adjustment Examples 1 to 4.

In step S1, the projector 1 projects an image onto a wall, as shown in FIG. 3.

To perform the luminance unevenness correction, the user operates the operation remote control 161 to select a luminance unevenness correction menu.

In step S2, the control section 18 evaluates whether the luminance unevenness correction menu has been selected. When the control section 18 determines that the luminance unevenness correction menu has been selected (YES in step S2), the control section 18 executes the luminance unevenness correction program stored in storage section 19. The luminance unevenness correction program is a program that executes the image processing method according to the present embodiment. When the control section 18 determines that the luminance unevenness correction menu has not been selected (NO in step S2), the control section 18 terminates the luminance unevenness correction.

1.3.1. Adjustment Example 1

The luminance unevenness correction according to Adjustment Example 1 will be described with reference to FIG. 3 and FIGS. 4A to 6B.

In step S3, a brightness setting screen is displayed based on the luminance unevenness correction program.

Figure 4A:
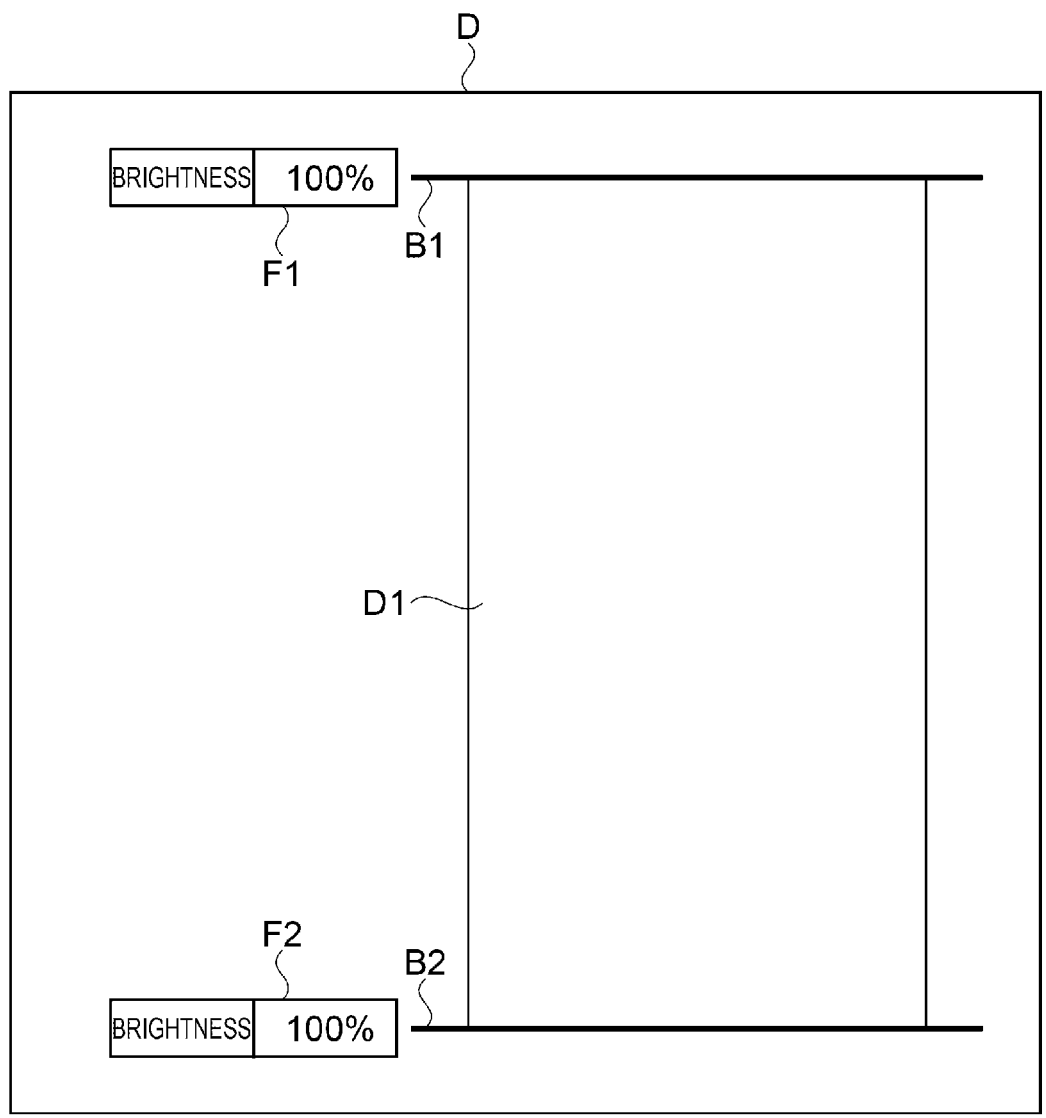
FIG. 4A is a descriptive diagram of an operation screen at the time of the luminance unevenness correction.

FIG. 4A shows an example of an operation screen as the brightness setting screen displayed on the screen D of the operation remote control 161. An image D1 being white across the entire screen and used to perform the brightness correction is displayed as the first image on the screen D. The image D1 may be the same image displayed in step S1, but a fully white screen for the brightness correction is preferably used in consideration of ease of the correction.

Adjustment bars B1 and B2 and brightness setting frames F1 and F2 are displayed on the screen D. The adjustment bar B1 is displayed along the upper edge of the image D1, and the adjustment bar B2 is displayed along the lower edge of the image D1.

The brightness setting frame F1 is displayed on the left side of the adjustment bar B1, and the brightness setting frame F2 is displayed on the left side of the adjustment bar B2. In the image D1, information on the brightness of an upper portion of the image D1 where the adjustment bar B1 is located is displayed in the brightness setting frame F1, and information on the brightness of a lower portion of the image D1 where the adjustment bar B2 is located is displayed in the brightness setting frame F2. In FIG. 4A, the brightness setting frames F1 and F2 show 100%, which indicates white.

Figure 4B:
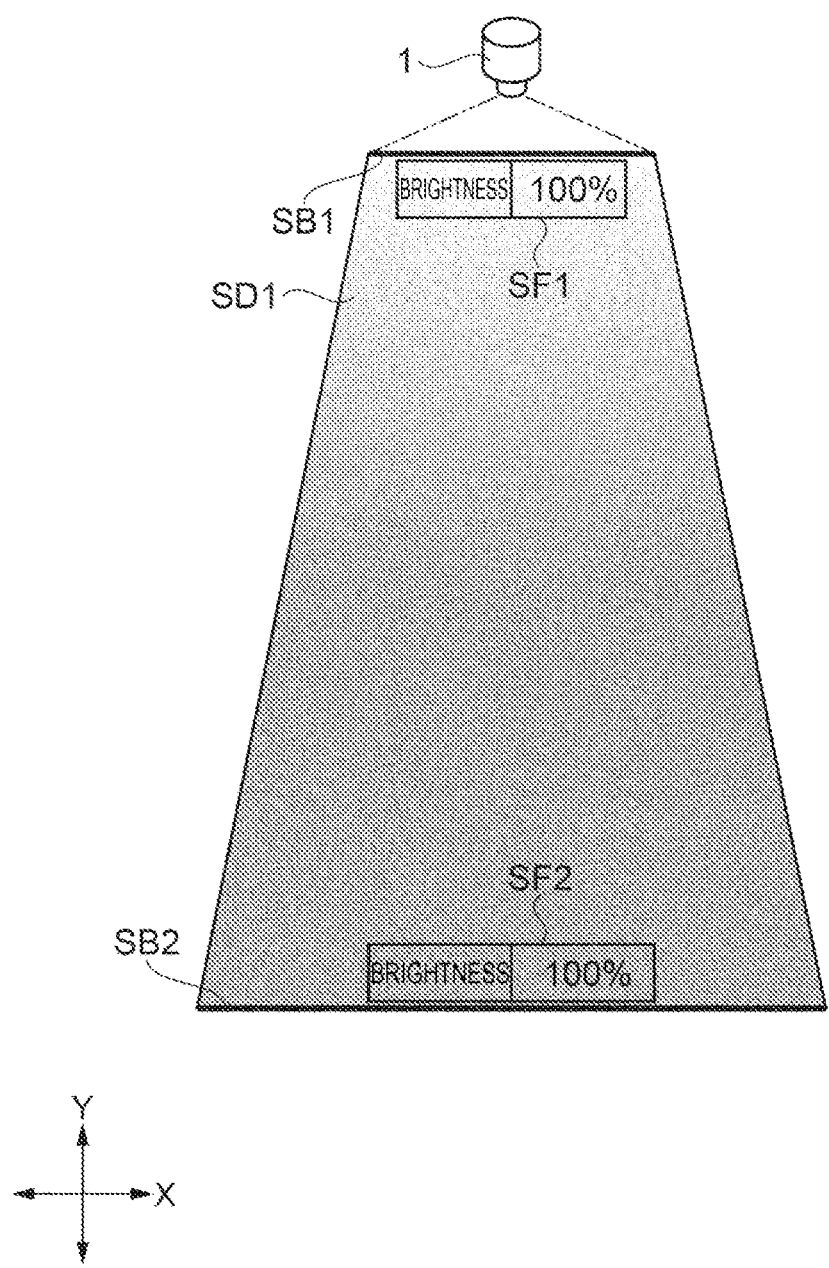
FIG. 4B is a descriptive diagram of a projection screen at the time of the luminance unevenness correction.

FIG. 4B shows a projection screen SD1 projected onto the wall by the projector 1. The projection screen SD1 is an image produced by the projection of the image D1 being white across the entire screen and used to perform the brightness correction as the first image. In Adjustment Example 1, the projection screen SD1 has a luminance unevenness pattern in which an upper portion thereof that faces the ceiling appears bright and a lower portion thereof that faces the floor appears dark.

Adjustment bars SB1 and SB2 and brightness setting frames SF1 and SF2 are superimposed by the OSD processing section 13 on the projection screen SD1, and the superimposed image is displayed. The adjustment bar SB1 corresponds to the adjustment bar B1 displayed on the screen D of the operation remote control 161, and the adjustment bar SB2 corresponds to the adjustment bar B2 displayed thereon. The brightness setting frames SF1 and SF2 show the same values as those of the brightness information displayed in the brightness setting frames F1 and F2 on the screen D of the operation remote control 161.

The user makes adjustment for eliminating the luminance unevenness while viewing the projection screen SD1 shown in FIG. 4B.

In the projection screen SD1 in Adjustment Example 1, the lower portion thereof is darker than the upper portion thereof. In this case, the user makes the adjustment in such a way that the brightness of the projection screen SD1 has homogeneous brightness with reference to the brightness at the lower portion, in other words, an intermediate grayscale corresponding to the brightness in the lower portion. Specifically, the user changes the brightness information in the brightness setting frames F1 and F2.

Figure 5A:
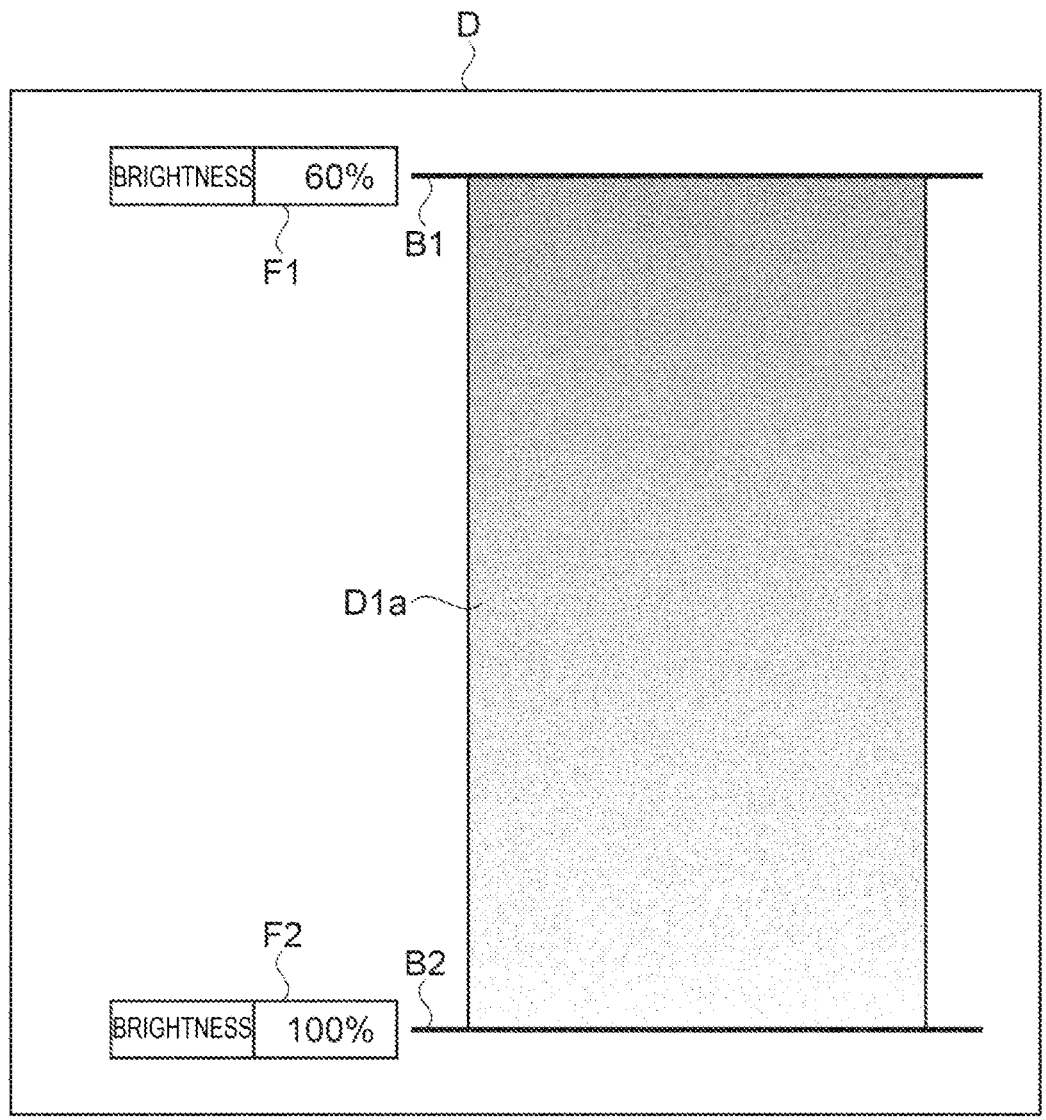
FIG. 5A is a descriptive diagram of the operation screen at the time of the luminance unevenness correction.

The user operates the operation remote control 161 to change the brightness information in the brightness setting frame F1 from 100% to 60%, as shown in FIG. 5A. The brightness information can be changed to any value between 100%, which corresponds to white, and 0%, which corresponds to black.

The user inputs the percent value corresponding to the intermediate grayscale with respect to the brightness set as the reference. As described above, in the projection screen SD1 shown in FIG. 4B, in which the brightness of the lower portion is set as the reference, the user sets the brightness information in the brightness setting frame F1 at 60%, which corresponds to the brightness of the lower portion, with the brightness information in the brightness setting frame F2 remaining at 100%.

In step S4, the control section 18 evaluates whether the user has inputted a change in the brightness information. When the control section 18 determines that a change in the brightness information has been inputted (YES in step S4), the control section 18 executes step S5. When the control section 18 determines that no change in the brightness information has been inputted (NO in step S4), the control section 18 skips step S5.

In step S5, a process based on the brightness information changed by the user is carried out.

When the brightness information in the brightness setting frame F1 is changed from 100% to 60%, the brightness of the image D1 in the range that overlaps with the adjustment bar B1 is changed to an intermediate grayscale corresponding to 60%, as shown in FIG. 5A. In addition, an image D1a, in which the brightness between the adjustment bars B1 and B2 is changed to linearly interpolated values between 60% and 100%, is generated and displayed. The image D1a is generated by the brightness correction section 121. The operation remote control 161 may instead be so configured that the image D1a is generated by an internal processor of the operation remote control 161.

The image D1a is projected by the projector 1.

Figure 5B:
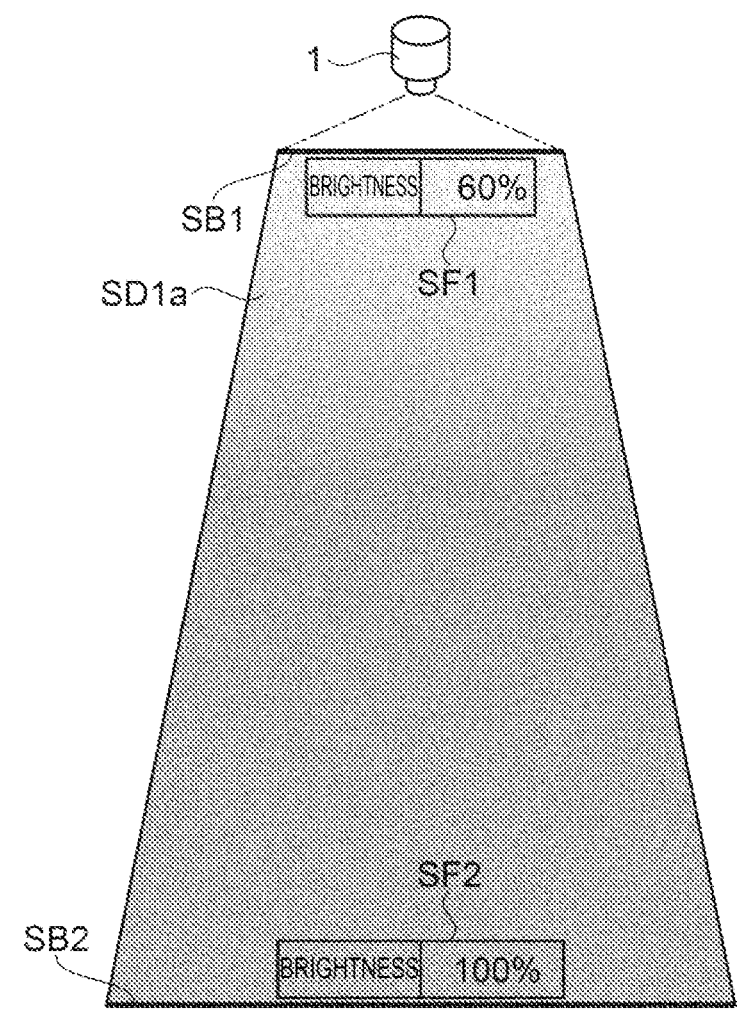
FIG. 5B is a descriptive diagram of the projection screen at the time of the luminance unevenness correction.

FIG. 5B shows a projection screen SD1a projected by the projector 1 based on the image D1a. In the projection screen SD1a, the brightness of the upper portion and the brightness of lower portion appear to be approximately the same, but the brightness near the center appears darker than the brightness of the upper and lower portions.

The user looks at the projection screen SD1a and further performs the luminance unevenness correction. In this case, the user operates the operation remote control 161 to display an adjustment bar B3. A first correction point in the present embodiment is at least one point contained in the adjustment bar B3.

In step S6, the control section 18 evaluates whether the user has instructed display of the adjustment bar B3. When the control section 18 determines that the user has instructed display of the adjustment bar B3 (YES in step S6), the control section 18 executes step S7. When the control section 18 determines that the user has not instructed display of the adjustment bar B3 (NO in step S6), the control section 18 terminates the luminance unevenness correction.

In step S7, the control section 18 displays the adjustment bar B3 based on the instruction of display of the adjustment bar B3.

Figure 6A:
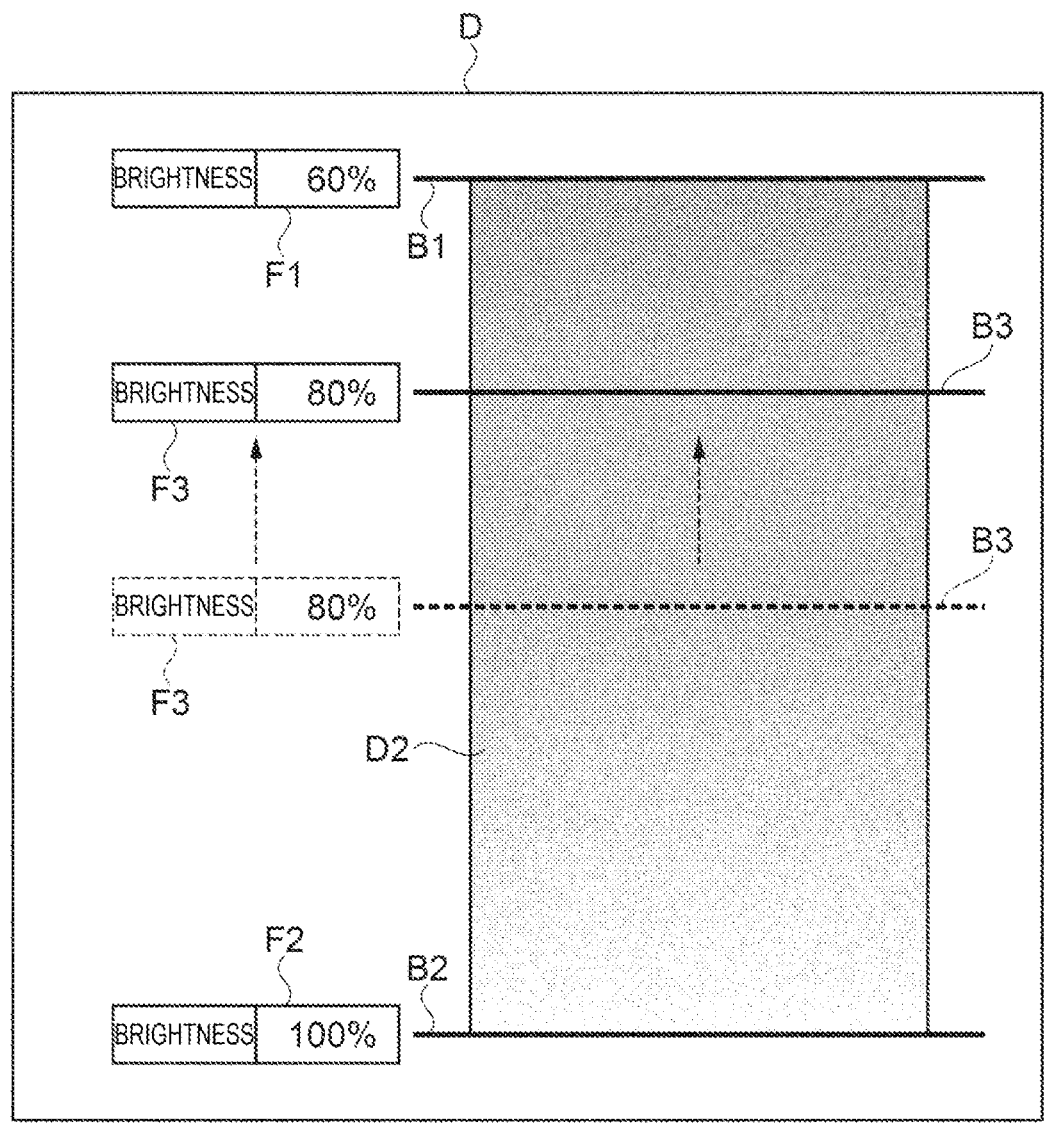
FIG. 6A is a descriptive diagram of the operation screen at the time of the luminance unevenness correction.

The adjustment bar B3 is displayed on the screen D of the operation remote control 161, as shown in FIG. 6A. The adjustment bar B3 is first displayed at a position indicated by the broken line containing a first position. The adjustment bar B3 is a line that traverses the images D1, D1a, and D2 in the direction X. The adjustment bar B3 is displayed at a center position between the adjustment bars B1 and B2 in the present embodiment, and may instead be displayed at a position specified by the user. The first position only needs to have at least any coordinate Y in the images D1, D1a, and D2.

A brightness setting frame F3 is displayed on the left side of the adjustment bar B3, as shown in FIG. 6A. First, the brightness corresponding to the position of the adjustment bar B3 indicated by the broken line is automatically displayed in the brightness setting frame F3. Since the adjustment bar B3 is displayed at a center position between the adjustment bars B1 and B2, the brightness setting frame F3 shows 80%, which is the center value between 60% and 100%.

The user operates the operation remote control 161 to move the position of the adjustment bar B3 in the direction Y. In the present embodiment, the adjustment bar B3 is moved to the position indicated by the solid line as a second position. The second position only needs to have at least any coordinate Y in the images D1, D1a, and D2.

In step S8, the control section 18 moves the position where the adjustment bar B3 is displayed based on the user's operation.

In FIG. 6A, the adjustment bar B3 indicated by the solid line is the adjustment bar B3 after the movement. Moving the adjustment bar B3 does not automatically change the brightness information displayed in the brightness setting frame F3. In other words, the position showing the brightness of 80% moves as the adjustment bar B3 moves. In steps S7 and S8, the value in the brightness setting frame F3 displayed in correspondence with the adjustment bar B3 may be changed.

In step S9, the control section 18 generates and displays an image D2 as a second image, which is derived from the first image D1a with the brightness thereof has been changed based on the position of the adjustment bar B3 after the movement.

The brightness correction section 121 generates the image D2 from the image D1a in such a way that the brightness of the range of the image D1a that overlaps with the adjustment bar B3 is changed to an intermediate grayscale corresponding to 80%, which is the value in the brightness setting frame F3, the brightness between the adjustment bars B1 and B3 is changed to linearly interpolated values between 60% and 80%, and the brightness between the adjustment bars B3 and B2 is changed to linearly interpolated values between 80% and 100%. The brightness between the adjustment bars B1 and B2 may be interpolated by using a trendline. Using a trendline allows smooth change in the brightness before and after the adjustment bar B3.

Figure 6B:
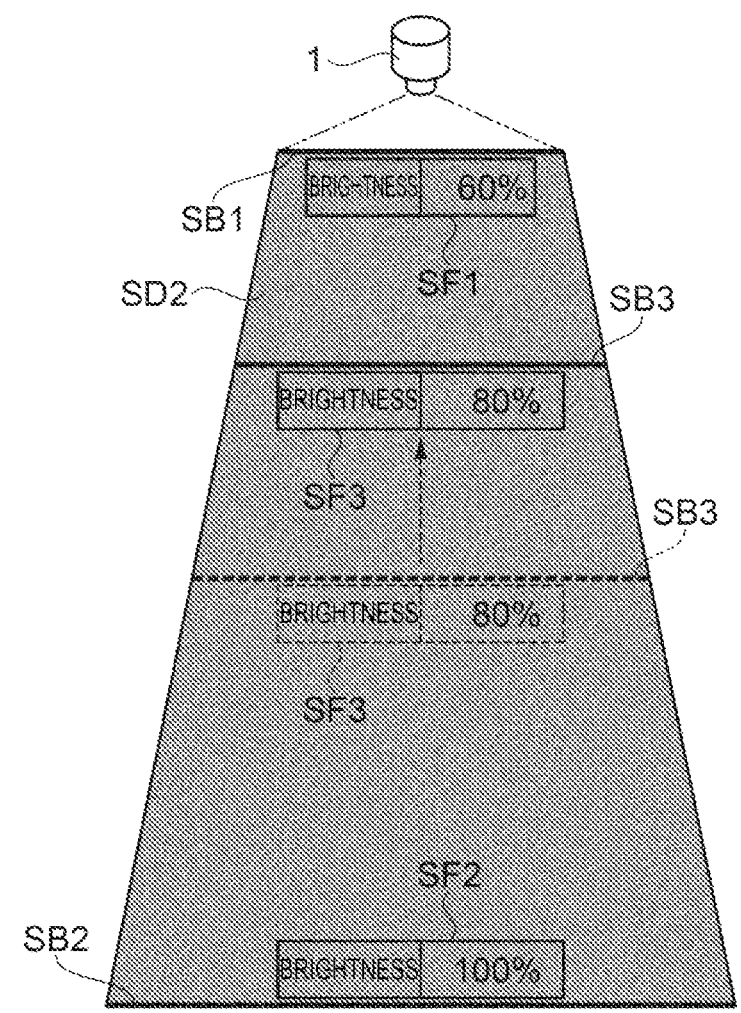
FIG. 6B is a descriptive diagram of the projection screen at the time of the luminance unevenness correction.

The image D2 is projected by the projector 1. FIG. 6B shows a projection screen SD2 projected by the projector 1 based on the image D2. In the projection screen SD2, the luminance unevenness between the upper and lower portions is substantially eliminated, and the resultant projected image appears to have the same degree of brightness across the image.

The user operates the operation remote control 161 to terminate the luminance unevenness correction.

The brightness information set in the brightness setting frames F1, F2, and F3 and the brightness setting frames SF1, SF2, and SF3 by the luminance unevenness correction is stored in the storage section 19 as the brightness correction information along with information on the positions of the adjustment bars B1, B2, and B3, and the adjustment bars SB1, SB2, and SB3, and the brightness correction section 121 performs image processing based on the stored brightness correction information.

The present embodiment discloses the case where the user operates the operation remote control 161 while viewing the operation screen displayed on the screen D of the operation remote control 161, and the user may instead perform the luminance unevenness correction without using the screen D but via the adjustment bars SB1, SB2, and SB3 and the brightness setting frames SF1, SF2, and SF3 displayed on the projection screen SD.

1.3.2. Adjustment Example 2

The luminance unevenness correction according to Adjustment Example 2 will be described with reference to FIG. 3 and FIGS. 7 to 9B. In Adjustment Example 2, the luminance unevenness having a pattern different from that in Adjustment Example 1 is corrected. Configurations common to those in Adjustment Example 1 have the same reference characters as those in Adjustment Example 1, and will not be described.

In step S3, the brightness setting screen is displayed based on the luminance unevenness correction program.

Figure 7:
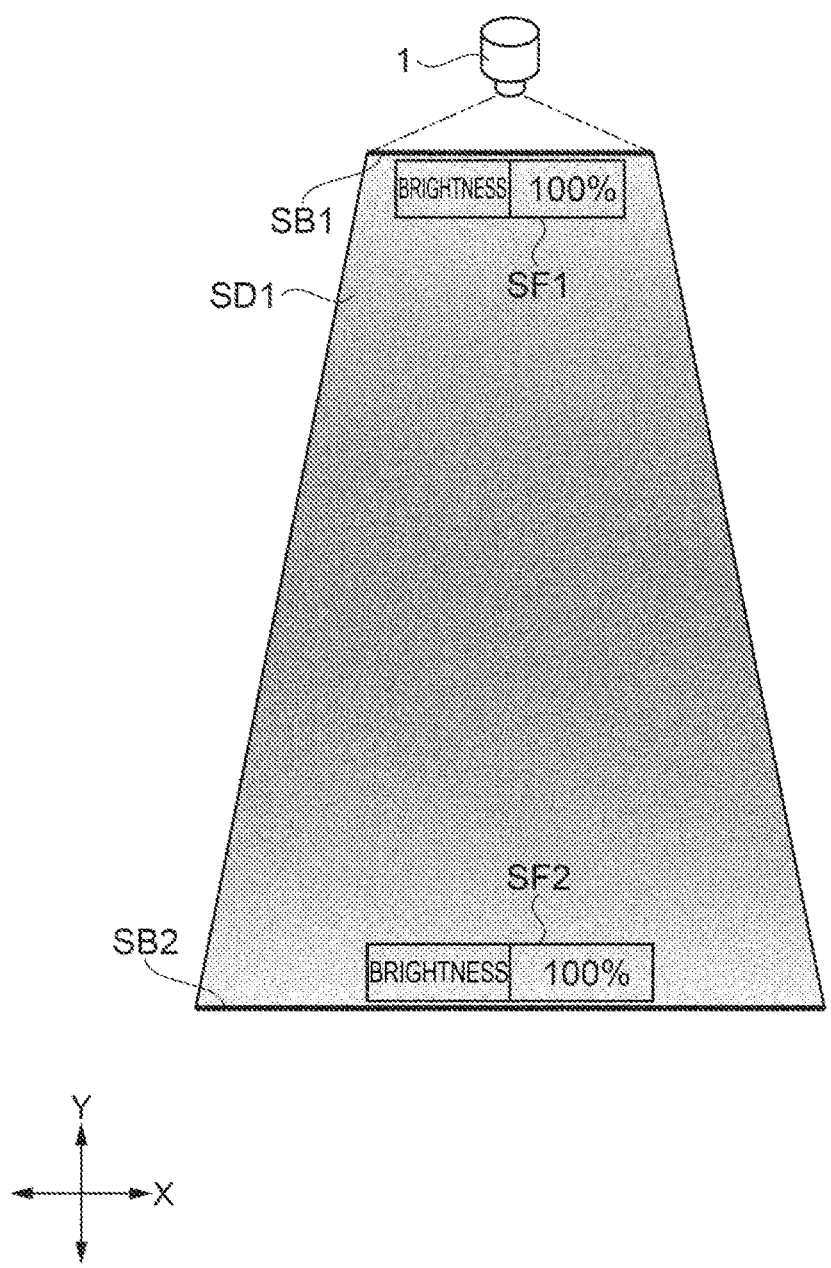
FIG. 7 is a descriptive diagram of the projection screen at the time of the luminance unevenness correction.

FIG. 7 shows the projection screen SD1 as the brightness setting screen projected onto the wall by the projector 1. The projection screen SD1 is an image produced by the projection of the image D1 being white across the entire screen and used to perform the brightness correction as the first image. In Adjustment Example 2, the projection screen SD1 has a luminance unevenness pattern in which the upper and lower portions appear bright and the vicinity of the center between the upper and lower portions appears dark.

The adjustment bars SB1 and SB2 and the brightness setting frames SF1 and SF2 are superimposed by the OSD processing section 13 on the projection screen SD1, and the superimposed image is displayed. The brightness information on the brightness of the image D1 being white across the entire screen and used to perform the brightness correction as the first image is displayed in the brightness setting frames SF1 and SF2.

Figure 8A:
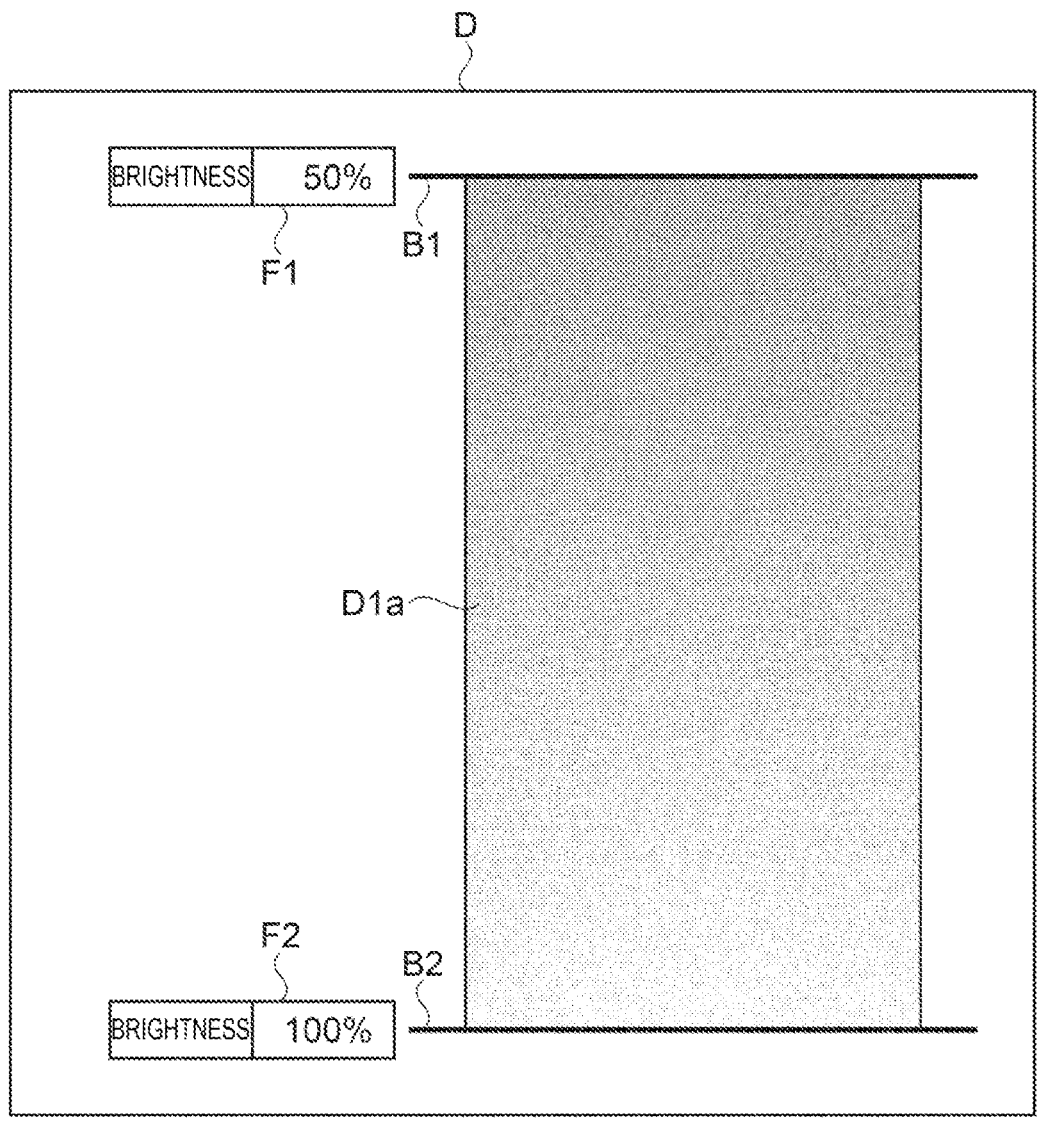
FIG. 8A is a descriptive diagram of the operation screen at the time of the luminance unevenness correction.

FIG. 8A shows the screen D of the operation remote control 161 after the brightness information in the brightness setting frame F1 has been changed by the user from 100% to 50%.

In step S5, the brightness correction section 121 generates the image D1a in which the brightness of the image D1 in the range that overlaps with the adjustment bar B1 is changed to an intermediate grayscale corresponding to 50%, and the brightness between the adjustment bars B1 and B2 is changed to linearly interpolated values between 50% and 100% based on the brightness information set in the brightness setting frame F1.

Figure 8B:
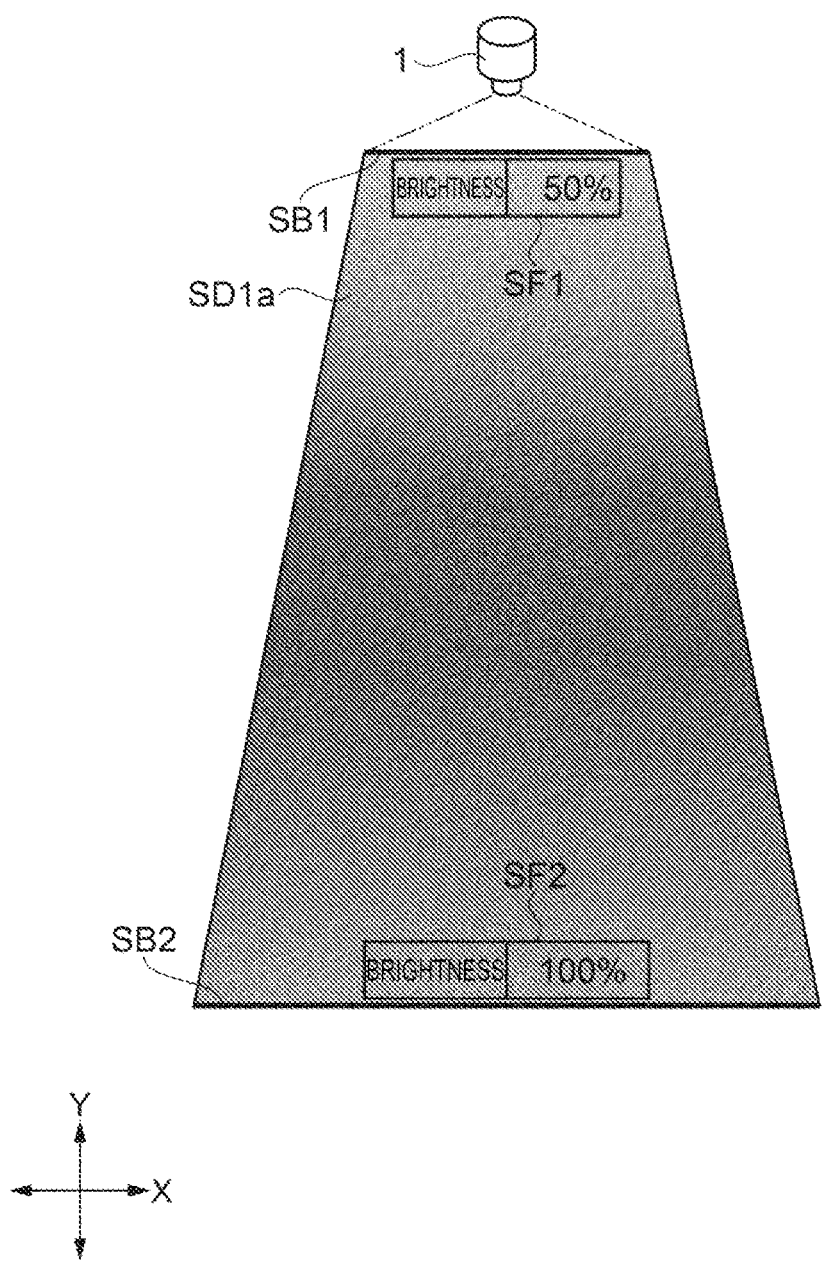
FIG. 8B is a descriptive diagram of the projection screen at the time of the luminance unevenness correction.

FIG. 8B shows the projection screen SD1a projected by the projector 1 based on the image D1a. In the projection screen SD1a, the brightness near the center is darker than the brightness in the upper and lower portions.

The user operates the operation remote control 161 to display the adjustment bar B3 as the first correction point and an adjustment bar B4 as a second correction point. In the flowchart of FIG. 3, the adjustment bars B3 and B4 are programmed to be displayed temporally separately from each other, and the adjustment bars B3 and B4 may instead be programmed to be displayed simultaneously.

The adjustment bar B4 is displayed at a desired position as a third position. The desired position is a position specified by the user or a position set in advance, such as the center position between the adjustment bars B3 and B2. The third position only needs to have at least any coordinate Y in the images D1, D1a, and D2.

In step S10, the control section 18 evaluates whether the user has instructed display of the adjustment bar B4. When the control section 18 determines that the user has instructed display of the adjustment bar B4 (YES in step S10), the control section 18 executes step S11. When the control section 18 determines that the user has not instructed display of the adjustment bar B4 (NO in step S10), the control section 18 terminates the luminance unevenness correction.

In step S11, control section 18 displays the adjustment bar B4 on the screen D of the operation remote control 161 and the projection screen SD1.

In step S12, the control section 18 moves the adjustment bar B4 from the desired position as the third position to a fourth position based on the user's operation. The fourth position only needs to have at least any coordinate Y in the images D1, D1a, and D2.

Figure 9A:
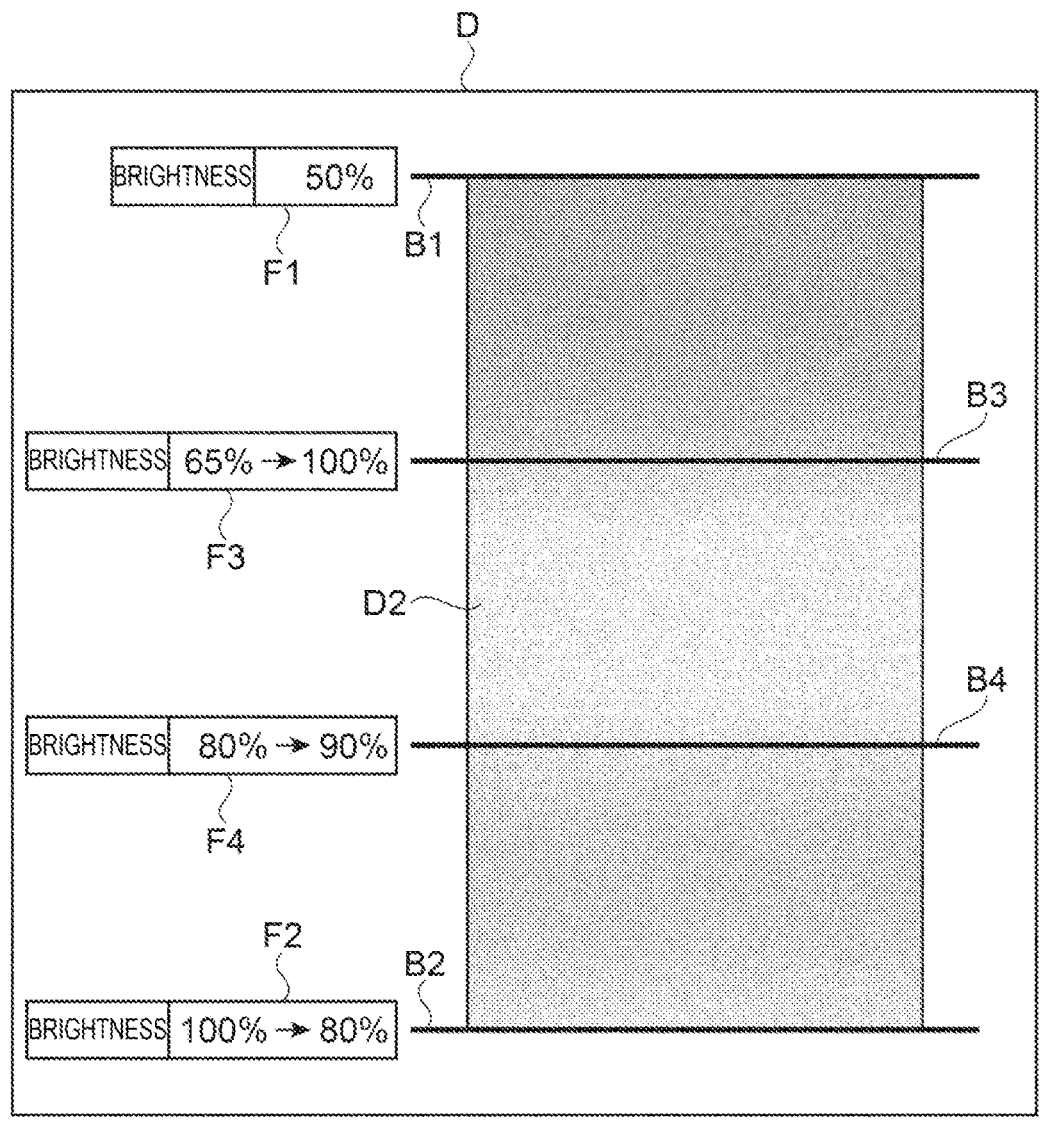
FIG. 9A is a descriptive diagram of the operation screen at the time of the luminance unevenness correction.

The adjustment bars B3 and B4 are displayed on the screen D of the operation remote control 161, as shown in FIG. 9A. The user operates the operation remote control 161 to change the value in the brightness setting frame F3 from 65% to 100%. The user further changes the value in the brightness setting frame F4 from 80% to 90%. The value of 65% in the brightness setting frame F3 and the value of 80% in the brightness setting frame F4 are values initially displayed based on the information on the positions of the adjustment bars B3 and B4 and the information on the brightness of the image D1a.

In steps S9 and S13, the control section 18 generates the image D2 as the second image in which the brightness of the image D1a in the ranges that overlap with the adjustment bars B1, B2, B3, and B4 is changed by the brightness correction section 121 to corresponding intermediate grayscales based on the brightness information set in the brightness setting frames F1, F2, F3, and F4, and the brightness between the adjustment bars B1 and B2 is changed to values interpolated linearly or by using a trendline.

The image D2 is displayed on the screen D of the operation remote control 161 and projected by the projector 1.

Figure 9B:
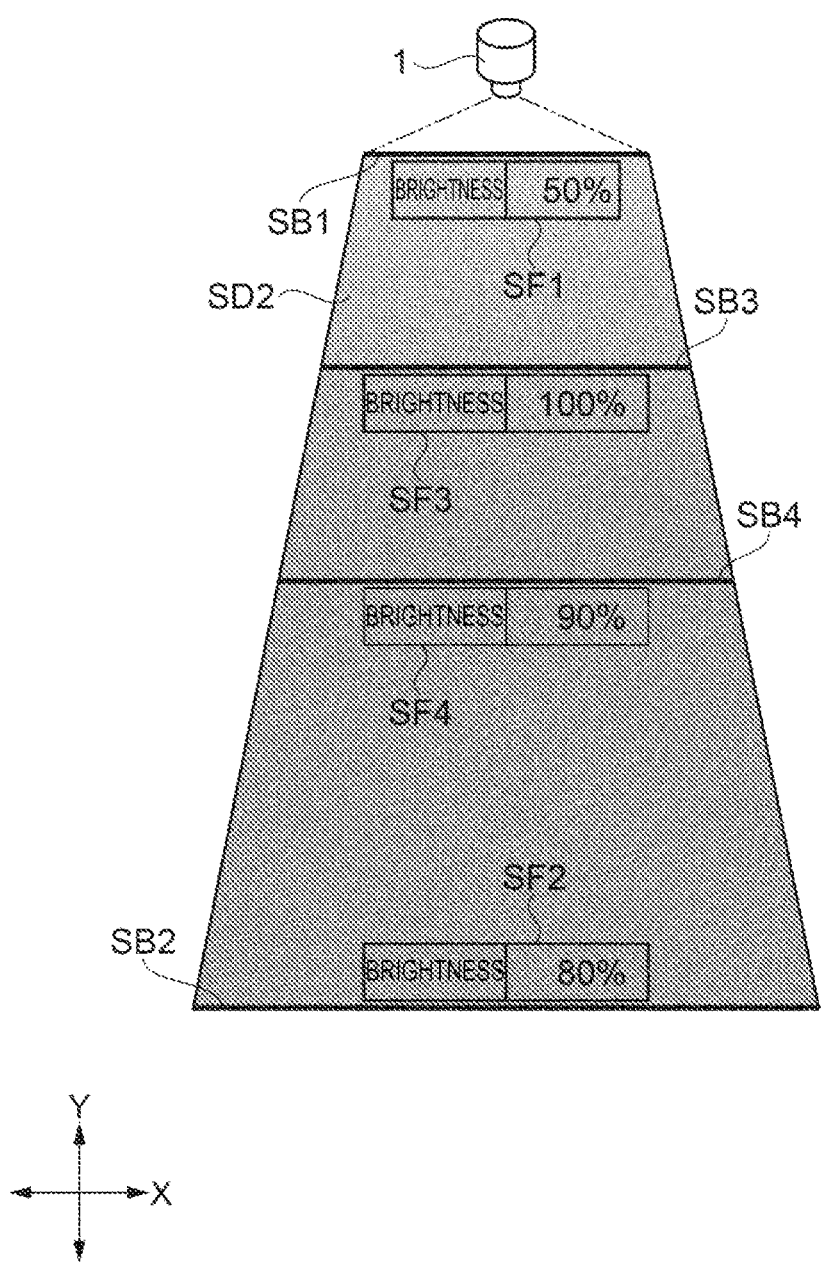
FIG. 9B is a descriptive diagram of the projection screen at the time of the luminance unevenness correction.

FIG. 9B shows the projection screen SD2 projected by the projector 1 based on the image D2. In the projection screen SD2, the luminance unevenness between the upper and lower portions is substantially eliminated, and the resultant projected image appears to have the same degree of brightness across the image.

The adjustment bars SB1, SB3, SB4, and SB2 and the brightness setting frames SF1, SF3, SF4, and SF2 are superimposed by the OSD processing section 13 on the projection screen SD2, and the superimposed image is displayed. The adjustment bar SB3 corresponds to the adjustment bar B3 displayed on the screen D of the operation remote control 161, and the adjustment bar SB4 corresponds to the adjustment bar B4 displayed thereon. The brightness setting frames SF3 and SF4 show the same values as those of the brightness information displayed in the brightness setting frames F3 and F4 on the screen D of the operation remote control 161.

The user operates the operation remote control 161 to terminate the luminance unevenness correction.

1.3.3. Adjustment Example 3

The luminance unevenness correction according to Adjustment Example 3 will be described with reference to FIG. 3 and FIGS. 10 to 11B. In Adjustment Example 3, the luminance unevenness having a pattern different from those in Adjustment Examples 1 and 2 is corrected. Configurations common to those in the other Adjustment Examples have the same reference characters as those in the other Adjustment Examples, and will not be described.

In step S3, the brightness setting screen is displayed based on the luminance unevenness correction program.

Figure 10:
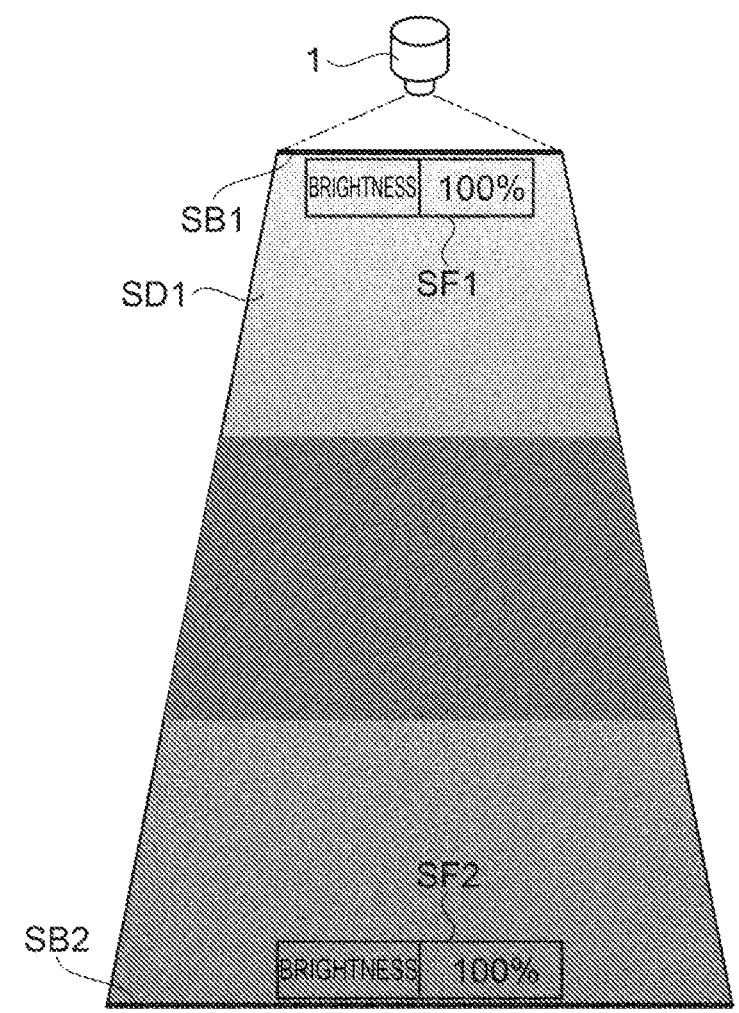
FIG. 10 is a descriptive diagram of the projection screen at the time of the luminance unevenness correction.

FIG. 10 shows the projection screen SD1 projected onto the wall by the projector 1. The projection screen SD1 is an image produced by the projection of the image D1 being white across the entire screen and used to perform the brightness correction as the first image. In Adjustment Example 3, the projection screen SD1 has a band-shaped portion that appears dark between the upper and lower portions. In addition, the difference between bright and dark is clearly visible at the boundary between the upper portion and the band-shaped portion and the boundary between the lower portion and the band-shaped portion. The boundaries having the clear difference between bright and dark are produced, for example, when a portion of the wall is made of a material having a different substance, color, or reflectance.

When luminance unevenness occurs in a pattern in which portions showing a difference between bright and dark appear as boundaries in the projection screen SD1, as shown in FIG. 10, two adjustment bars are displayed at the boundaries. When two types of brightness information can be set at the boundaries, the number of adjustment bars displayed at the boundaries may be one.

Figure 11A:
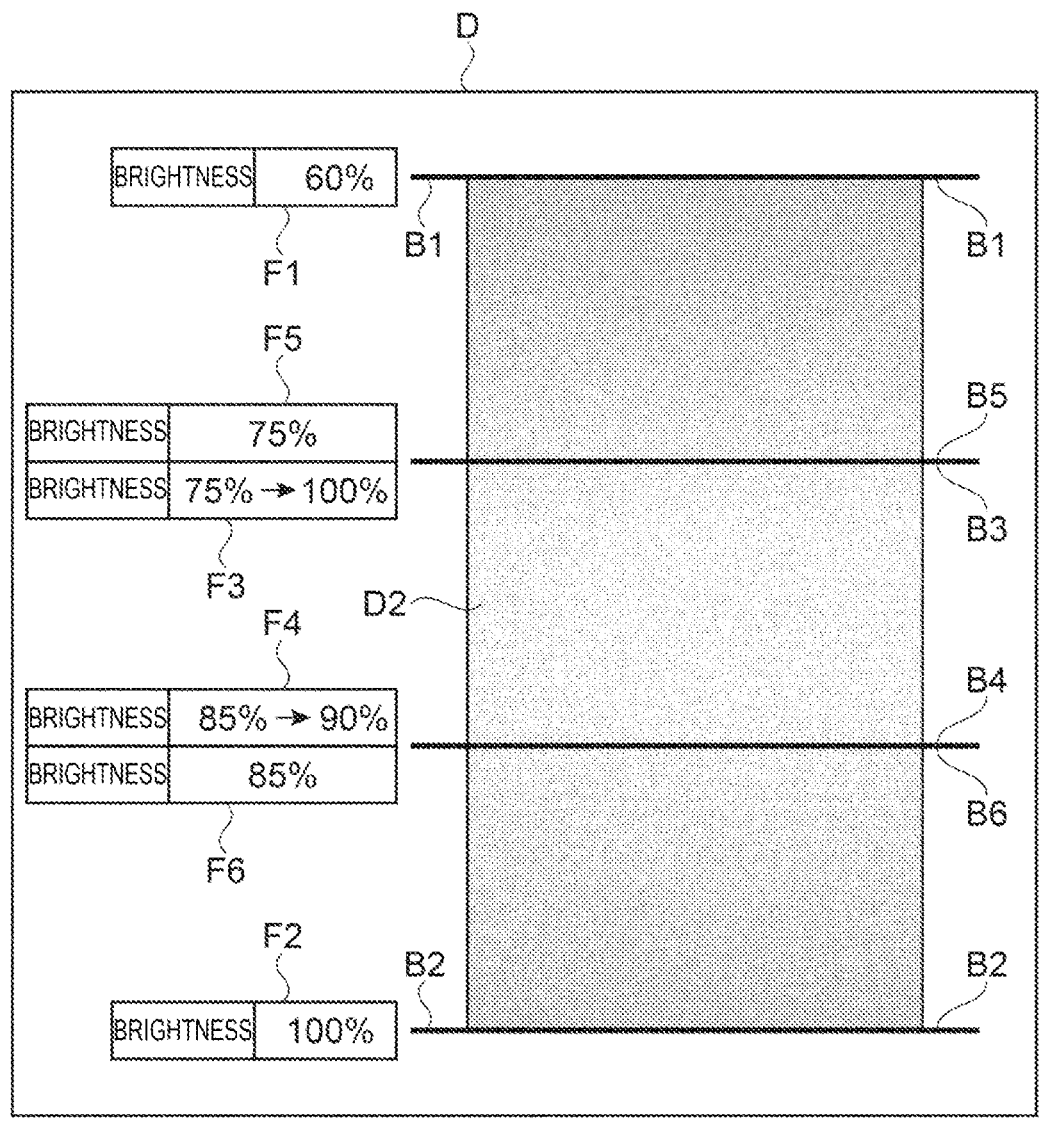
FIG. 11A is a descriptive diagram of the operation screen at the time of the luminance unevenness correction.

Two adjustment bars are displayed on the screen D of the operation remote control 161 at each of the two locations of the boundaries, as shown in FIG. 11A.

Adjustment bars B5 and B3 are displayed at positions adjacent to each other in the upward-downward direction. Adjustment bars B4 and B6 are displayed at positions adjacent to each other in the upward-downward direction.

Specifically, the user causes the adjustment bar B5 to be displayed on the screen D and then moves the adjustment bar B5 to the position adjacent to the adjustment bar B3. Similarly, the user causes the adjustment bar B6 to be displayed on the screen D and then moves the adjustment bar B6 to the position adjacent to the adjustment bar B4. The adjustment bar B5 may be programmed so as to be displayed at the position adjacent to the adjustment bar B3. The adjustment bar B6 can be programmed in the same manner.

The brightness setting frame F5 corresponding to the adjustment bar B5 is displayed next to and above the brightness setting frame F3 corresponding to the adjustment bar B3. The brightness setting frame F6 corresponding to the adjustment bar B6 is displayed next to and below the brightness setting frame F4 corresponding to the adjustment bar B4.

The user sets the value in the brightness setting frame F1 at 60%, the value in the brightness setting frame F5 at 75%, the value in the brightness setting frame F3 at 100%, the value in the brightness setting frame F4 at 90%, the value in the brightness setting frame F6 at 85%, and the value in the brightness setting frame F2 at 100%, as shown in FIG. 11A.

The brightness correction section 121 generates the image D2 as the second image in which the brightness of the image in the ranges that overlap with the adjustment bars B1, B2, B3, B4, B5, and B6 is changed to corresponding intermediate grayscales, and the brightness between the adjustment bars B1 and B5, the brightness between the adjustment bars B3 and B4, and the brightness between the adjustment bars B6 and B2 are changed to linearly interpolated values based on the brightness information set in the brightness setting frames F1, F2, F3, F4, F5, and F6. Note that since the adjustment bars B5 and B3 are adjacent to each other, no interpolation is performed. The same holds true for the brightness between the adjustment bars B4 and B6.

The image D2 is displayed on the screen D of the operation remote control 161 and projected by the projector 1.

Figure 11B:
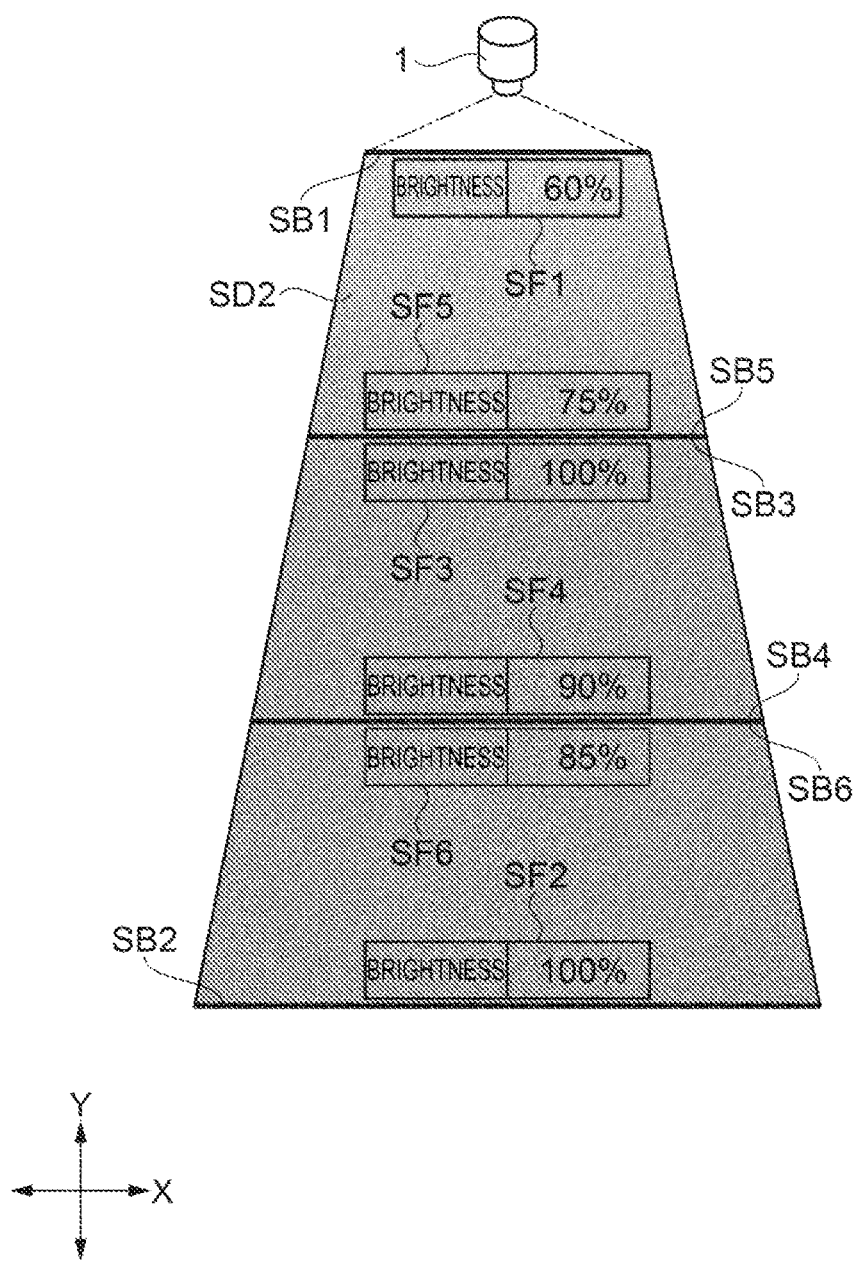
FIG. 11B is a descriptive diagram of the projection screen at the time of the luminance unevenness correction.

FIG. 11B shows the projection screen SD2 projected by the projector 1 based on the image D2. In the projection screen SD2, the luminance unevenness between the upper and lower portions is substantially eliminated, and the resultant projected image appears to have the same degree of brightness across the image.

The adjustment bars SB1, SB5, SB3, SB4, SB6, and SB2 and the brightness setting frames SF1, SF5, SF3, SF4, SF6, and SF2 are superimposed by the OSD processing section 13 on the projection screen SD2, and the superimposed image is displayed. The adjustment bar SB5 corresponds to the adjustment bar B5 displayed on the screen D of the operation remote control 161, and the adjustment bar SB6 corresponds to the adjustment bar B6 displayed thereon. The brightness setting frames SF5 and SF6 show the same values as those of the brightness information displayed in the brightness setting frames F5 and F6 on the screen D of the operation remote control 161.

The user operates the operation remote control 161 to terminate the luminance unevenness correction.

1.3.4. Adjustment Example 4

The luminance unevenness correction according to Adjustment Example 4 will be described with reference to FIGS. 3 and 12. Configurations common to those in the other Adjustment Examples have the same reference characters as those in the other Adjustment Examples, and will not be described. Adjustment example 4 shows a case where the projection light from the projector 1 has an elliptical shape and the projector 1 projects an image having an elliptical shape.

Figure 12:
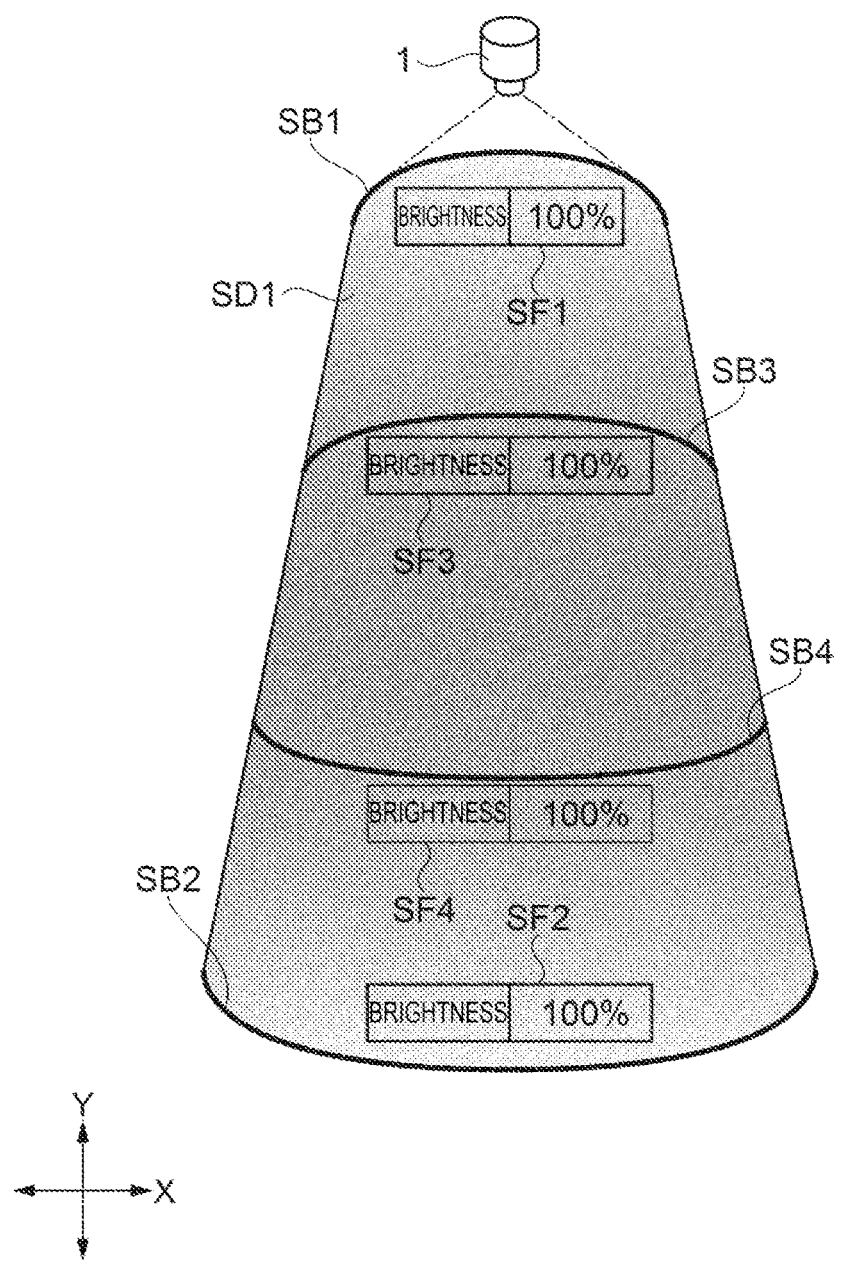
FIG. 12 is a descriptive diagram of the projection screen at the time of the luminance unevenness correction.

In the present embodiment, the adjustment bars SB1, SB3, SB4, and SB2 displayed on the projection screen SD in steps S3, S7, and S11 are displayed as curves having curved shapes in accordance with the shape of the projection light from the projector 1, as shown in FIG. 12. The brightness setting frames SF1, SF3, SF4, and SF2 are displayed in the form of straight lines in FIG. 12, and may instead be displayed in the form of curves, as the adjustment bars SB1, SB3, SB4, and SB2 are.

Adjustment Example 4 differs from Adjustment Examples 1 to 3 in that the adjustment bars SB1, SB3, SB4, and SB2 displayed on the projection screen SD are displayed in the form of curves, but other points are the same as those in Adjustment Examples 1 to 3, and the luminance unevenness correction can be performed in the same manner as in Adjustment Examples 1 to 3.

2. Second Embodiment

2.1. Overall Configuration of Image Display Apparatus

Figure 13:
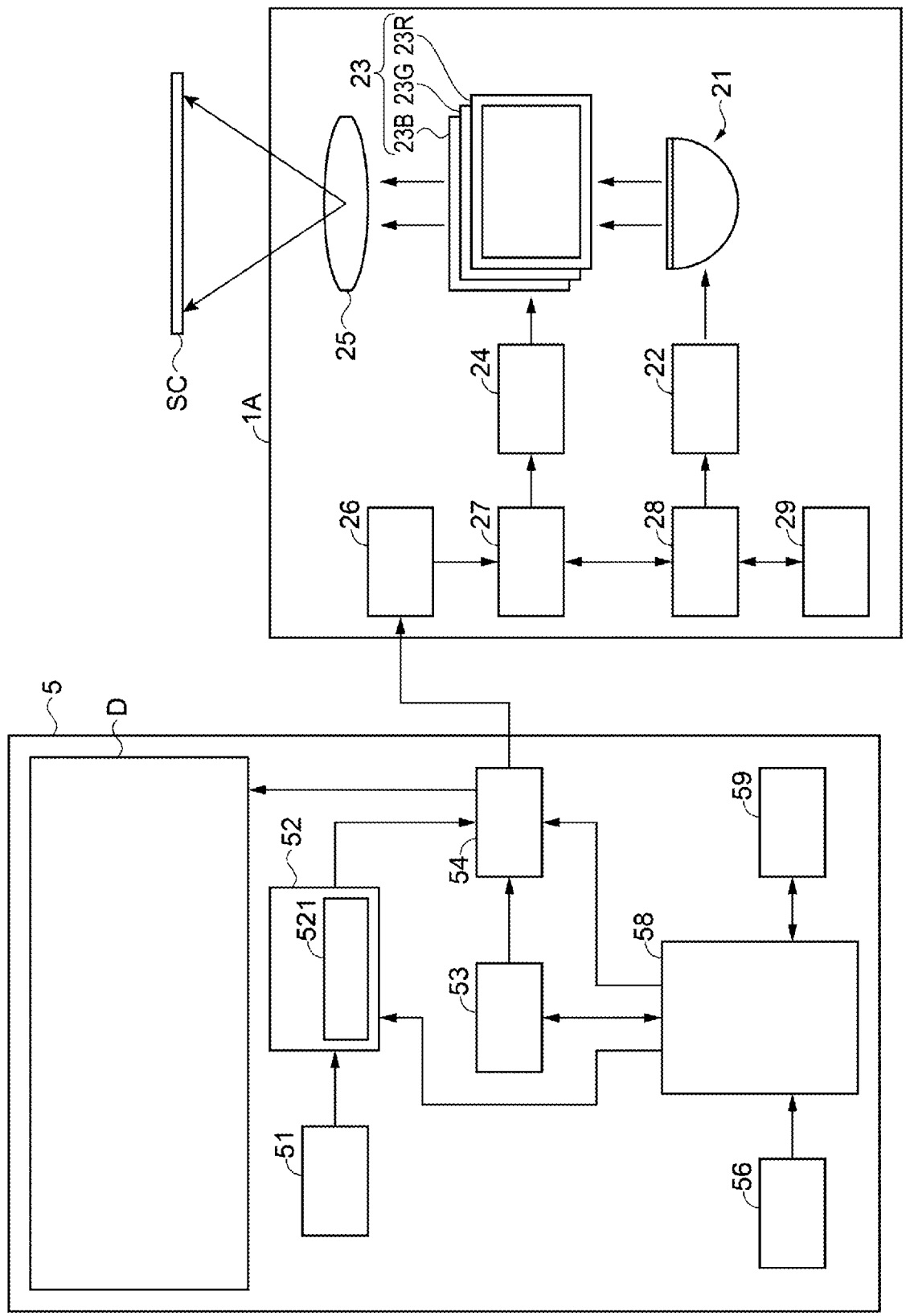
FIG. 13 is a block diagram showing a schematic configuration of a portable terminal apparatus.

An overall configuration of a portable terminal apparatus 5 as the image display apparatus will be described with reference to FIG. 13. FIG. 13 is a block diagram showing a schematic configuration of the portable terminal apparatus 5 according to the second embodiment.

In the portable terminal apparatus 5, the luminance unevenness correction program is stored therein, and the user corrects the luminance unevenness produced by the projector 1A via the portable terminal apparatus 5.

The portable terminal apparatus 5 is, for example, a smartphone, a tablet PC, a laptop PC, or a PDA (personal digital assistant).

The portable terminal apparatus 5 has, as functional blocks, a signal input section 51, an image processing section 52, a brightness correction section 521, an OSD processing section 53, an image information output section 54, an input section 56, a control section 58, which controls each of the sections described above, a storage section 59, and a screen D as a display section.

The signal input section 51 outputs image information read from the storage section 59 or supplied via the Internet line that is not shown to the image processing section 52.

The image processing section 52 performs predetermined image processing based on the image processing programs on the image information and outputs the processed image information to the image information output section 54. Examples of the predetermined image processing include image quality adjustment, such as luminance unevenness correction, resolution conversion, and sharpness adjustment.

In the image processing section 52, the brightness correction section 521 corrects the brightness of the image information based on the brightness correction information. The brightness of the image information is corrected based on the brightness unevenness correction program, and the information used in the correction is stored as the brightness correction information in the storage section 59. The brightness correction information is also stored in a storage section 29 of the projector 1A, which will be described later.

The OSD processing section 53 outputs OSD image information, which is a menu image or a message image to be superimposed on the image information processed by the image processing section 52, based on an instruction from the control section 58. The OSD image information is stored in the storage section 59.

The image information output section 54 outputs the image information and the OSD image information to the projector 1A.

The input section 56 accepts the user's input operation. The input section 56 includes a keyboard, a mouse, a touch input, a voice input, a gesture input, and the like.

The screen D displays the first image used to correct the brightness of the image information.

When the user operates the screen D of the portable terminal apparatus 5, the input section 56 outputs an operation signal according to the content of the user's operation to the control section 58.

The control section 58 oversees and controls the functional blocks of the portable terminal apparatus 5.

The storage section 59 stores the image processing programs including the luminance unevenness correction program, the control programs, the control data used by the control programs, and the content images and other pieces of image information. The control data includes the first image used by the luminance unevenness correction program, the brightness correction information set by the luminance unevenness correction program, and other pieces of information. The control programs including the luminance unevenness correction program, the control data, and the image information are stored in the external server and can be downloaded via the Internet line in a timely manner.

The projector 1A projects an image based on the image information supplied from the portable terminal apparatus 5 on the screen SC. In the second embodiment, a wall or a pillar is used as the screen SC, as in the first embodiment.

The projector 1A includes the light source section 21, the liquid crystal light valve 23R for red, the liquid crystal light valve 23G for green, the liquid crystal light valve 23B for blue, the light source driver 22, the light valve driver 24, the projection lens 25, an image input section 26, an image processing section 27, a controller section 28, and a storage section 29.

The storage section 29 stores the brightness correction information used in the brightness correction performed by the image processing section 27. The brightness correction information is stored in the storage section 29 when the portable terminal apparatus 5 performs the luminance unevenness correction. The storage section 29 further stores image information corresponding to the content images to be displayed by the projector 1A. The content image information stored in the storage section 29 is supplied from the portable terminal apparatus 5 or via the Internet line.

The image processing section 27 corrects the content image information based on the brightness correction information stored in the storage section 29 and outputs the corrected information to the light valve driver 24.

The projector 1A can be installed in the same manner as in the installation examples shown in FIGS. 2A, 2B, and 2C.

When luminance unevenness occurs on the screen projected by the projector 1A, the luminance unevenness correction can be performed by using the portable terminal apparatus 5 in the same manner as in the first embodiment. In the description of the first embodiment, the screen D of the operation remote control 161 can be replaced with the screen D of the portable terminal apparatus 5 as appropriate.

The present embodiment can provide the effects below as described above.

The luminance unevenness correction method as the image processing method according to an aspect of the present disclosure is the image processing method for the projector 1 or the portable terminal apparatus 5 as the image display apparatus that displays an image modulated by the liquid crystal light valve 23 as the light modulator, and includes step S3 as displaying the image D1 as the first image, step S7 as displaying the adjustment bar B3 or SB3 as the first correction point, with which first brightness is associated, at a position indicated by the broken line as the first position in the image D1, step S8 as moving the adjustment bar B3 or SB3 from the first position to the position indicated by the solid line as the second position along the axis Y as the first axis of the image D1, and step S9 as generating the image D2 as the second image that contains a position corresponding to the second position in the image D1 and has the first brightness in the range that intersects with the axis Y.

As described above, the luminance unevenness correction method as the image processing method according to the present embodiment includes displaying the adjustment bar B3 or SB3, with which the first brightness is associated, in the image D1, moving the adjustment bar B3 or SB3 from the first position to the second position, and generating the image D2, in which the range containing the position corresponding to the second position has the first brightness.

Therefore, even when luminance unevenness occurs in a variety of patterns, the luminance unevenness correction method provided by the present embodiment is readily capable of correction suitable for the patterns of luminance unevenness.

The luminance unevenness correction method as the image processing method according to the aspect of the present disclosure further includes step S11 as displaying the adjustment bar B4 or SB4 as the second correction point, with which the second brightness is associated, at a desired position as the third position in the image D1 as the first image, step S12 as moving the adjustment bar B4 or SB4 from the third position to the fourth position along the axis Y as the first axis, and step S13 as generating the image D2 as the second image that contains a position corresponding to the fourth position in the image D1 and has the second brightness in the range that intersects with the axis Y.

As described above, the luminance unevenness correction method as the image processing method according to the present embodiment includes displaying the adjustment bar B4 or SB4, with which the second brightness is associated, in the image D1, moving the adjustment bar B4 or SB4 from the third position to the fourth position, and generating the image D2, in which the range containing the position corresponding to the fourth position is the second brightness.

Therefore, even when luminance unevenness occurs in a variety of patterns, the luminance unevenness correction method provided by the present embodiment is readily capable of correction of the luminance unevenness.

In the luminance unevenness correction method as the image processing method according to the aspect of the present disclosure, step S7 as displaying the adjustment bar B3 or SB3 as the first correction point includes displaying the adjustment bar B3 or SB3 as a line indicating the range that intersects with the axis Y.

As described above, the luminance unevenness correction method as the image processing method according to the aspect of the present disclosure includes displaying the adjustment bar B3 or SB3 as a line indicating the range that intersects with the axis Y.

Therefore, the adjustment range can be readily specified, and even when luminance unevenness occurs in a variety of patterns, the luminance unevenness correction method provided by the present embodiment is readily capable of correction of the luminance unevenness.

In the luminance unevenness correction method as the image processing method according to the aspect of the present disclosure, step S11 as displaying the adjustment bar B4 or SB4 as the second correction point includes displaying the adjustment bar B4 or SB4 as a line indicating the range that intersects with the axis Y, step S12 as moving the adjustment bar B4 or SB4 to the fourth position includes moving the adjustment bar B4 or SB4 to the fourth position, and in step S13 as generating the image D2 as the second image, the range that intersects with the axis Y overlaps with the adjustment bar B4 or SB4.

As described above, in the luminance unevenness correction method as the image processing method according to the aspect of the present disclosure, the line indicating the range that intersects with the axis Y overlaps with the adjustment bar B4 or SB4.

Therefore, the adjustment range can be readily specified, and even when luminance unevenness occurs in a variety of patterns, the luminance unevenness correction method provided by the present embodiment is readily capable of correction of the luminance unevenness.

In the luminance unevenness correction method as the image processing method according to the aspect of the present disclosure, the adjustment bar SB4 as a line indicating the range that intersects with the axis Y is displayed is a curve having a curved shape.

In the projector 1 that displays an image having an elliptical shape, even when luminance unevenness occurs in a variety of patterns, the luminance unevenness correction method provided by the present embodiment is readily capable of correction of the luminance unevenness.

The luminance unevenness correction method as the image processing method according to the aspect of the present disclosure further includes step S7 or S8 as changing the first brightness associated with the adjustment bar B3 or SB3 as the first correction point to the third brightness.

Therefore, even when luminance unevenness occurs in a variety of patterns, the luminance unevenness correction method provided by the present embodiment is readily capable of correction of the luminance unevenness.

The luminance unevenness correction method as the image processing method according to the aspect of the present disclosure further includes step S13 as linearly changing the brightness between the adjustment bar B3 or SB3, which contains a position corresponding to the second position in the image D1 as the first image and shows the range that intersects with the axis Y as the first axis, and the adjustment bar B4 or SB4, which contains a position corresponding to the fourth position in the image D1 and shows the range that intersects with the axis Y.

Therefore, even when luminance unevenness occurs in a variety of patterns, the luminance unevenness correction method provided by the present embodiment is readily capable of correction of the luminance unevenness.

In the image processing method according to the aspect of the present disclosure, the image display apparatus is the portable terminal apparatus 5, and step S3 as displaying the image D1 as the first image is displaying the image D1 on the screen D of the portable terminal apparatus 5.

The user can therefore perform the luminance unevenness correction while viewing the screen D of a smartphone as the portable terminal apparatus 5.

A program according to an aspect of the present disclosure causes the projector 1 or the portable terminal apparatus 5 as the image display apparatus that displays an image modulated by the liquid crystal light valve 23 as the light modulator to display the image D1 as the first image, display the adjustment bar B3 or SB3 as the first correction point, with which the first brightness is associated, at a position indicated by the broken line as the first position in the image D1, move the adjustment bar B3 or SB3 from the first position to the position indicated by the solid line as the second position along the axis Y as the first axis of the image D1, and generate the image D2 as the second image that contains a position corresponding to the second position in the image D1 and has the first brightness in the range that intersects with the axis Y.

As described above, the luminance unevenness correction program as the program according to the present embodiment causes the projector 1 or the portable terminal apparatus 5 to display the adjustment bar B3 or SB3, with which the first brightness is associated, in the image D1, move the adjustment bar B3 or SB3 from the first position to the second position, and generate the image D2, in which the range containing the position corresponding to the second position has the first brightness.

Therefore, even when luminance unevenness occurs in a variety of patterns, the luminance unevenness correction program provided by the present embodiment is readily capable of correction of the luminance unevenness.

The projector 1 according to an aspect of the present disclosure includes the optical apparatus 20 and the processor 10, and the processor 10 uses the optical apparatus 20 to display the image D1 as the first image on the projection screen SD, uses the optical apparatus 20 to display the adjustment bar B3 or SB3 as the first correction point, with which the first brightness is associated, at a position indicated by the broken line as the first position in the image D1, moves the adjustment bar B3 or SB3 from the first position to the position indicated by the solid line as the second position along the axis Y as the first axis of the image D1, and generates the image D2 as the second image that contains a position corresponding to the second position in the image D1 and has the first brightness in the range that intersects with the axis Y.

As described above, the projector 1 according to the present embodiment displays the adjustment bar B3 or SB3, with which the first brightness is associated, in the image D1, moves the adjustment bar B3 or SB3 from the first position to the second position, and generates the image D2, in which the range containing the position corresponding to the second position has the first brightness.

Therefore, even when luminance unevenness occurs in a variety of patterns, the projector 1 provided by the present embodiment is readily capable of correction of the luminance unevenness.

In the embodiments described above, the first axis is described as the axis Y, and the first axis can instead be the axis X. For example, when the projector 1 is installed on the left side of a wall, and images are projected from the left side of the wall toward the right side thereof, and when the lengthwise direction of the projection screen SD is the rightward-leftward direction, the first axis may be the axis X, and the adjustment bars may each be displayed along the direction Y.

Variations

The embodiments described above can be modified, for example, as will be described below. Furthermore, one or more of arbitrarily selected aspects of the variations described below may be combined with each other as appropriate.

Variation 1: The projector 1 may be installed at a location other than a ceiling or wall, or may be installed so as directly face the projection surface. For example, the projector 1 may be installed on a floor. The projection screen SD may have a shape other than a trapezoidal shape. For example, the projection screen SD may have a rectangular or circular shape.

Variation 2: The first axis may extend in a direction other than the lengthwise direction of the projection screen SD, or may extend in the widthwise direction thereof. For example, when the projector 1 is installed on the left side of a wall, and images are projected from the left side of the wall toward the right side thereof, and when the widthwise direction of the projection screen SD is the upward-downward direction, the first axis may be the axis Y, which is the widthwise direction, and the adjustment bars may each be displayed along the direction X.

Variation 3: In each of the embodiments, the first or second correction point is at least one point on any of the solid lines that are the adjustment bars B1 to B6 and SB1 to SB6, but not necessarily. The first or second correction point may be displayed, for example, by using a circle or rectangle, or using an arrow indicating a position along the first axis.

Variation 4: In Adjustment Examples 1 to 3, the adjustment bars B1 to B6 and SB1 to SB6 are straight lines, but not necessarily. The adjustment bars B1 to B6 and SB1 to SB6 may all be curves, or at least one of the adjustment bars B1 to B6 and SB1 to SB6 may be a curve.

The present disclosure has been described based on suitable embodiments, but the present disclosure is not limited to the embodiments described above. The configuration of each portion in the present disclosure can be replaced with any configuration that provides the same function described in the embodiments described above, and any configuration can be added to the embodiments.

What is claimed is:

1. An image processing method comprising: displaying a first image; displaying a first correction point, with which first brightness is associated, at a first position in the first image; moving the first correction point from the first position to a second position along a first axis of the first image; and generating a second image that has the first brightness in a first range including a position corresponding to the second position and intersecting with the first axis; further comprising: displaying a second correction point, with which second brightness is associated, at a third position in the first image; moving the second correction point from the third position to a fourth position along the first axis; and generating the second image that has the second brightness in a second range including a position corresponding to the fourth position that intersecting with the first axis.

2. The image processing method according to claim 1, wherein displaying the first correction point includes displaying a line indicating the first range.

3. The image processing method according to claim 1, wherein displaying the second correction point includes displaying a line indicating the second range, moving the second correction point to the fourth position includes moving the line indicating the second range to the fourth position, and in generating the second image, the second range overlaps with the line.

4. The image processing method according to claim 2, wherein the line indicating the second range is a curve.

5. The image processing method according to claim 1, further comprising
changing the first brightness associated with the first correction point to third brightness.

6. The image processing method according to claim 1, further comprising linearly changing the brightness of the second image between the position corresponding to the second position and the position corresponding to the fourth position from one of the position corresponding to the second position and the position corresponding to the fourth position toward the other.

7. The image processing method according to claim 1, wherein
displaying the first image is displaying the first image on a screen of a portable terminal apparatus.

8. A non-transitory computer-readable storage medium storing a program that causes an image display apparatus to display a first image, display a first correction point, with which first brightness is associated, at a first position in the first image, move the first correction point from the first position to a second position along a first axis of the first image, and generate a second image that has the first brightness in a range including a position corresponding to the second position and intersecting with the first axis; further comprising: displaying a second correction point, with which second brightness is associated, at a third position in the first image; moving the second correction point from the third position to a fourth position along the first axis; and generating the second image that has the second brightness in a second range including a position corresponding to the fourth position that intersecting with the first axis.

9. A projector comprising: an optical apparatus; and a processor programmed to display, using the optical apparatus, a first image on a projection screen, to display, using the optical apparatus, a first correction point, with which first brightness is associated, at a first position in the first image, move the first correction point from the first position to a second position along a first axis of the first image, and generate a second image that has the first brightness in a range including a position corresponding to the second position and intersecting with the first axis; further comprising: displaying a second correction point, with which second brightness is associated, at a third position in the first image; moving the second correction point from the third position to a fourth position along the first axis; and generating the second image that has the second brightness in a second range including a position corresponding to the fourth position that intersecting with the first axis.

* * * * *